US012772303B2

(12) United States Patent
Li et al.

(10) Patent No.: US 12,772,303 B2
(45) Date of Patent: Oct. 20, 2026

(54) METHOD FOR ESTABLISHING SLB CONNECTION, ELECTRONIC DEVICE, AND COMMUNICATION SYSTEM

(71) Applicant: Huawei Technologies Co., Ltd., Shenzhen (CN)

(72) Inventors: Yumin Li, Shanghai (CN); Yan Chen, Shanghai (CN); Yao Zhao, Shanghai (CN); Xudong Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 317 days.

(21) Appl. No.: 18/641,771

(22) Filed: Apr. 22, 2024

(65) Prior Publication Data

US 2024/0276565 A1 Aug. 15, 2024

Related U.S. Application Data

(63) Continuation of application No. PCT/CN2022/114541, filed on Aug. 24, 2022.

(30) Foreign Application Priority Data

Oct. 22, 2021 (CN) ........................ 202111234162.8

(51) Int. Cl.
*H04W 4/80* (2018.01)
*H04W 76/10* (2018.01)
*H04W 76/14* (2018.01)

(52) U.S. Cl.
CPC .................................. *H04W 76/10* (2018.02)

(58) Field of Classification Search
CPC ....... H04W 76/10; H04W 4/80; H04W 76/14; Y02D 30/70
USPC ......................................................... 370/329
See application file for complete search history.

(56) References Cited

U.S. PATENT DOCUMENTS

| | | | | |
|---|---|---|---|---|
| 2002/0183050 | A1 | 12/2002 | Kuon et al. | |
| 2014/0342670 | A1 | 11/2014 | Kang et al. | |
| 2018/0192460 | A1 * | 7/2018 | Huh | H04W 4/023 |
| 2022/0201113 | A1 | 6/2022 | Peng | |
| 2024/0155276 | A1 * | 5/2024 | Shi | B60R 11/04 |
| 2024/0242606 | A1 * | 7/2024 | Ying | G08G 1/096766 |

FOREIGN PATENT DOCUMENTS

| | | | |
|---|---|---|---|
| CN | 1388697 | A | 1/2003 |
| CN | 108064036 | A | 5/2018 |
| CN | 110191442 | A | 8/2019 |
| CN | 112272375 | A | 1/2021 |
| CN | 112449328 | A | 3/2021 |

(Continued)

OTHER PUBLICATIONS

SparkLink, TR/XS 00001-2021, SparkLink, Apr. 15, 2021, with English translation total 36 pages.

*Primary Examiner* — Ayman A Abaza
*Assistant Examiner* — Tracy L Williams
(74) *Attorney, Agent, or Firm* — Conley Rose, P.C.

(57) ABSTRACT

A first device sends first information to the second device by using a sparklink-low energy (SLE) access technology, and sends second information to the second device by using a sparklink-basic (SLB) access technology. The second device establishes an SLB connection to the first device based on the first information and the second information by using the SLB access technology.

20 Claims, 26 Drawing Sheets

(56) References Cited

FOREIGN PATENT DOCUMENTS

| | | | |
|---|---|---|---|
| EP | 4391598 | A1 | 6/2024 |
| EP | 4391615 | A1 | 6/2024 |
| WO | 2018000134 | A1 | 1/2018 |

* cited by examiner

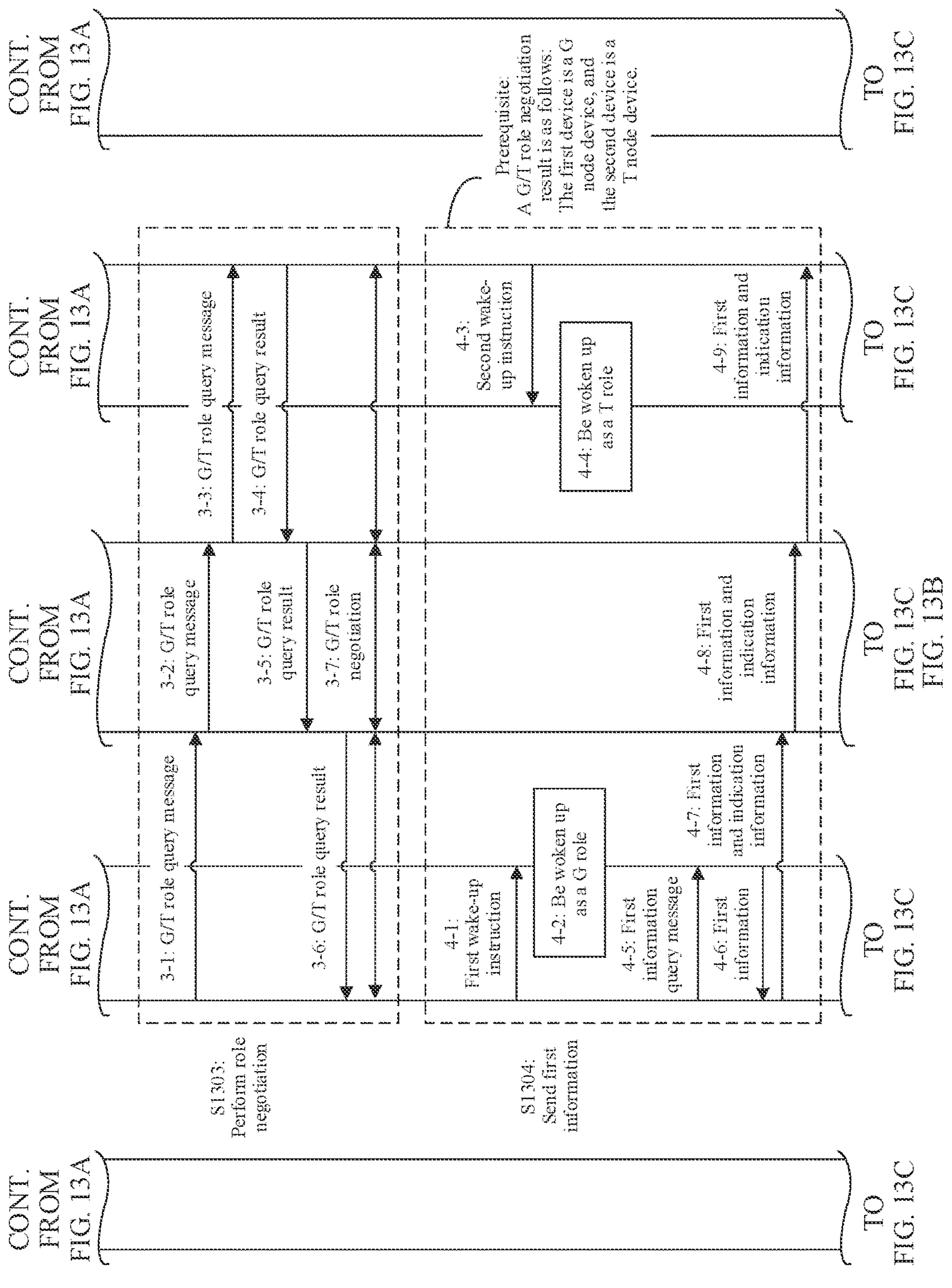
CONT. FROM FIG. 13A
CONT. FROM FIG. 13A
CONT. FROM FIG. 13A
CONT. FROM FIG. 13A
CONT. FROM FIG. 13A
Prerequisite: A G/T role negotiation result is as follows: The first device is a G node device, and the second device is a T node device.
S1303: Perform role negotiation
3-1: G/T role query message
3-2: G/T role query message
3-3: G/T role query message
3-4: G/T role query result
3-5: G/T role query result
3-6: G/T role query result
3-7: G/T role negotiation
S1304: Send first information
4-1: First wake-up instruction
4-2: Be woken up as a G role
4-3: Second wake-up instruction
4-4: Be woken up as a T role
4-5: First information query message
4-6: First information
4-7: First information and indication information
4-8: First information and indication information
4-9: First information and indication information
TO FIG. 13C
TO FIG. 13C
TO FIG. 13C FIG. 13B
TO FIG. 13C
TO FIG. 13C

TO

CONT.
FROM

METHOD FOR ESTABLISHING SLB CONNECTION, ELECTRONIC DEVICE, AND COMMUNICATION SYSTEM

CROSS-REFERENCE TO RELATED APPLICATIONS

This application is a continuation of International Patent Application No. PCT/CN2022/114541 filed on Aug. 24, 2022, which claims priority to Chinese Patent Application No. 202111234162.8 filed on Oct. 22, 2021. The disclosures of the aforementioned applications are hereby incorporated by reference in their entireties.

TECHNICAL FIELD

Embodiments of the present disclosure relate to the field of communication technologies, and in particular, to a method for establishing a sparklink-basic (SLB) connection, an electronic device, and a communication system.

BACKGROUND

Currently, the sparklink alliance provides a short-range wireless communication protocol architecture. Short-range radio access technologies that can be provided by the protocol architecture include an SLB access technology and a sparklink-low energy (SLE) access technology. The SLB access technology supports a high-bandwidth data transmission capability. When an electronic device has a high-bandwidth service requirement (for example, a high-definition video projection requirement), the electronic device usually establishes an SLB connection to a peer device by using the SLB access technology to process a corresponding service. However, a process of establishing an SLB connection is complex and therefore takes a long time. This compromise user experience.

SUMMARY

The present disclosure provides a method for establishing an SLB connection, an electronic device, and a communication system, to resolve a problem in the conventional technology that a process of establishing an SLB connection is complex and therefore takes a long time, compromising user experience.

To achieve the foregoing objective, the following technical solutions are used in the present disclosure.

According to a first aspect, an embodiment of the present disclosure provides a method for establishing an SLB connection, applied to a first device and a second device, where the first device is a grant node device, the second device is a terminal node device, and both the first device and the second device support communication by using an SLB access technology and an SLE access technology. The method includes the first device sends first information to the second device by using the SLE access technology. The first device sends second information to the second device by using the SLB access technology. The second device establishes an SLB connection to the first device based on the first information and the second information by using the SLB access technology.

In this embodiment, the first information is a related parameter or related information used to accelerate the establishment of the SLB connection between the first device and the second device. After the first device sends the first information to the second device by using the SLE access technology, the second device may quickly establish the SLB connection to the first device based on the first information and the second information by using the SLB access technology. This can simplify a process of establishing the SLB connection and shorten duration for establishing the SLB connection.

In some embodiments, that the first device sends first information to the second device by using the SLE access technology includes: When an SLE connection has been established between the first device and the second device, the first device sends the first information to the second device through the SLE connection; or when no SLE connection is established between the first device and the second device, the first device sends the first information to the second device through SLE broadcast.

In the method provided in this embodiment, the second device may quickly receive the first information sent by the first device, to shorten duration occupied by an information receiving process and improve efficiency of the SLB connection.

In some embodiments, the first information includes at least one of the following content: an broadcast frequency and bandwidth of the first device; a root index of a synchronization signal of the first device; a physical layer identifier of the first device; an authentication credential of the first device; all or some content of broadcast information of the first device; and all or some content of communication domain system information of the first device. When the first information is sent through SLE broadcast, the first information does not include the physical layer identifier or the authentication credential.

In some embodiments, the second information includes: a synchronization signal; a part, not included in the first information, of the broadcast information; and a part, not included in the first information, of the communication domain system information.

It should be noted that, when the first information includes all the content of the broadcast information and/or all the content of the communication domain system information, the second information does not need to include the broadcast information or the communication domain system information. In other words, in a process of establishing the SLB connection, the second device does not need to receive the broadcast information and/or the communication domain system information by using the SLB access technology again. This can reduce time taken by the second device to receive the information, and improve efficiency of the SLB connection.

In some embodiments, when the first information includes the broadcast frequency and the bandwidth, that the second device establishes an SLB connection to the first device based on the first information and the second information by using the SLB access technology includes the second device receives the synchronization signal based on the broadcast frequency and the bandwidth. The second device synchronizes with the first device based on the synchronization signal. The second device receives, based on the broadcast frequency and the bandwidth, a part, not included in the first information, of the second information, and the part, not included in the first information, of the communication domain system information. The second device establishes the SLB connection to the first device based on the broadcast information and the communication domain system information by using the SLB access technology.

In the method provided in this embodiment, the second device may receive information based on a specific broadcast frequency and specific bandwidth, to avoid a process of searching, by the second device, for an broadcast frequency and determining appropriate receiving bandwidth, and improve efficiency of the SLB connection.

In some embodiments, when the first information includes the root index of the synchronization signal, that the second device establishes an SLB connection to the first device based on the first information and the second information by using the SLB access technology includes the second device receives the synchronization signal based on the root index of the synchronization signal. The second device synchronizes with the first device based on the synchronization signal. The second device receives the part, not included in the first information, of the broadcast information, and the part, not included in the first information, of the communication domain system information. The second device establishes the SLB connection to the first device based on the broadcast information and the communication domain system information by using the SLB access technology.

In some embodiments, the synchronization signal includes a first training signal FTS and a secondary training signal STS, the root index of the synchronization signal includes an FTS root index and an STS root index, and that the second device receives the synchronization signal based on the root index of the synchronization signal includes the second device receives the FTS based on the FTS root index, and receives the STS based on the STS root index.

In the method provided in this embodiment of the present disclosure, when the second device receives the synchronization signal, a long process of performing blind detection on a received signal by using the root index of the synchronization signal to determine the synchronization signal is avoided. This can improve efficiency of receiving the synchronization signal, and therefore improve efficiency of the SLB connection.

In some embodiments, when the first information includes the physical layer identifier of the first device, that the second device establishes an SLB connection to the first device based on the first information and the second information by using the SLB access technology includes the second device receives the synchronization signal. The second device synchronizes with the first device based on the synchronization signal. The second device receives the part, not included in the first information, of the broadcast information, and the part, not included in the first information, of the communication domain system information. The second device establishes the SLB connection to the first device in a non-contention-based random access mode based on the physical layer identifier, the broadcast information, and the communication domain system information.

In the method provided in this embodiment of the present disclosure, the second device can determine non-contention-based access resource information of the first device based on the physical layer identifier, to perform synchronous connection to the first device in the non-contention-based random access mode. In this method, time taken by a synchronous connection process can be reduced, to improve efficiency of the SLB connection.

In some embodiments, when the first information includes the authentication credential, that the second device establishes an SLB connection to the first device based on the first information and the second information by using the SLB access technology includes the second device receives the synchronization signal. The second device synchronizes with the first device based on the synchronization signal. The second device receives the part, not included in the first information, of the broadcast information, and the part, not included in the first information, of the communication domain system information. The second device establishes the SLB connection to the first device based on the authentication credential, the broadcast information, and the communication domain system information by using the SLB access technology.

In the method provided in this embodiment of the present disclosure, after the second device establishes the synchronous connection to the first device, a pairing and authentication process may be simplified or avoided based on the authentication credential, to improve efficiency of the SLB connection.

According to a second aspect, an embodiment of the present disclosure provides a method for establishing an SLB connection, applied to a first device, where the first device supports communication by using an SLB access technology and an SLE access technology. The method includes the first device sends first information to a second device by using the SLE access technology. The first device sends second information to the second device by using the SLB access technology. The first device establishes an SLB connection to the second device according to a request of the second device, where the request is sent by the second device based on the first information and the second information. The first device is a grant node device, and the second device is a terminal node device.

In some embodiments, that the first device sends first information to the second device by using the SLE access technology includes: When an SLE connection has been established between the first device and the second device, the first device sends the first information to the second device through the SLE connection.

In some other embodiments, that the first device sends first information to the second device by using the SLE access technology includes: When no SLE connection is established between the first device and the second device, the first device sends the first information to the second device through SLE broadcast.

In some embodiments, the first information includes at least one of the following content: an broadcast frequency and bandwidth of the first device; a root index of a synchronization signal of the first device; a physical layer identifier of the first device; an authentication credential of the first device; all or some content of broadcast information of the first device; and all or some content of communication domain system information of the first device. When the first information is sent through SLE broadcast, the first information does not include the physical layer identifier or the authentication credential.

In some embodiments, the second information includes: a synchronization signal; a part, not included in the first information, of the broadcast information; and a part, not included in the first information, of the communication domain system information.

According to a third aspect, an embodiment of the present disclosure provides a method for establishing an SLB connection, applied to a second device, where the second device supports communication by using an SLB access technology and an SLE access technology.

The method includes the second device receives, by using the SLE access technology, first information sent by a first device. The second device receives, by using the SLB access technology, second information sent by the first device. The second device establishes an SLB connection to the first device based on the first information and the second information by using the SLB access technology. The first device is a grant node device, and the second device is a terminal node device.

In some embodiments, that the second device receives, by using the SLE access technology, first information sent by a first device includes: When an SLE connection has been established between the first device and the second device, the second device receives, through the SLE connection, the first information sent by the first device.

In some embodiments, that the second device receives, by using the SLE access technology, first information sent by a first device includes: When no SLE connection is established between the first device and the second device, the second device receives, through SLE broadcast, the first information sent by the first device.

In some embodiments, the first information includes at least one of the following content: an broadcast frequency and bandwidth of the first device; a root index of a synchronization signal of the first device; a physical layer identifier of the first device; an authentication credential of the first device; all or some content of broadcast information of the first device; and all or some content of communication domain system information of the first device. When the first information is received through SLE broadcast, the first information does not include the physical layer identifier or the authentication credential.

In some embodiments, the second information includes: a synchronization signal; a part, not included in the first information, of the broadcast information; and a part, not included in the first information, of the communication domain system information.

In some embodiments, when the first information includes the broadcast frequency and the bandwidth, that the second device establishes an SLB connection to the first device based on the first information and the second information by using the SLB access technology includes the second device receives the synchronization signal based on the broadcast frequency and the bandwidth. The second device synchronizes with the first device based on the synchronization signal. The second device receives, based on the broadcast frequency and the bandwidth, a part, not included in the first information, of the second information, and the part, not included in the first information, of the communication domain system information. The second device establishes the SLB connection to the first device based on the broadcast information and the communication domain system information by using the SLB access technology.

In some embodiments, when the first information includes the root index of the synchronization signal, that the second device establishes an SLB connection to the first device based on the first information and the second information by using the SLB access technology includes the second device receives the synchronization signal based on the root index of the synchronization signal. The second device synchronizes with the first device based on the synchronization signal. The second device receives the part, not included in the first information, of the broadcast information, and the part, not included in the first information, of the communication domain system information. The second device establishes the SLB connection to the first device based on the broadcast information and the communication domain system information by using the SLB access technology.

In some embodiments, the synchronization signal includes a first training signal FTS and a secondary training signal STS, the root index of the synchronization signal includes an FTS root index and an STS root index, and that the second device receives the synchronization signal based on the root index of the synchronization signal includes the second device receives the FTS based on the FTS root index, and receives the STS based on the STS root index.

In some embodiments, when the first information includes the physical layer identifier of the first device, that the second device establishes an SLB connection to the first device based on the first information and the second information by using the SLB access technology includes the second device receives the synchronization signal. The second device synchronizes with the first device based on the synchronization signal. The second device receives the part, not included in the first information, of the broadcast information, and the part, not included in the first information, of the communication domain system information. The second device establishes the SLB connection to the first device in a non-contention-based random access mode based on the physical layer identifier, the broadcast information, and the communication domain system information.

In some embodiments, when the first information includes the authentication credential, that the second device establishes an SLB connection to the first device based on the first information and the second information by using the SLB access technology includes the second device receives the synchronization signal. The second device synchronizes with the first device based on the synchronization signal. The second device receives the part, not included in the first information, of the broadcast information, and the part, not included in the first information, of the communication domain system information. The second device establishes the SLB connection to the first device based on the authentication credential, the broadcast information, and the communication domain system information by using the SLB access technology.

According to a fourth aspect, an embodiment of the present disclosure provides a communication system, including a first device and a second device, where the first device is a grant node device, the second device is a terminal node device, and both the first device and the second device support communication by using an SLB access technology and an SLE access technology.

The first device is configured to send first information to the second device by using the SLE access technology, and send second information to the second device by using the SLB access technology.

The second device is configured to establish an SLB connection to the first device based on the first information and the second information by using the SLB access technology.

According to a fifth aspect, an embodiment of the present disclosure provides an electronic device, where the electronic device supports communication by using an SLB access technology and an SLE access technology, the electronic device is a grant node device, and the electronic device is configured to perform the method for establishing an SLB connection in the second aspect.

According to a sixth aspect, an embodiment of the present disclosure provides an electronic device, where the electronic device supports communication by using an SLB access technology and an SLE access technology, the electronic device is a terminal node device, and the electronic device is configured to perform the method for establishing an SLB connection in the third aspect.

According to a seventh aspect, an embodiment of the present disclosure provides a chip, where the chip includes a processor, and the processor executes a computer program stored in a memory, to implement the method for establishing an SLB connection in the second aspect or the third aspect.

According to an eighth aspect, an embodiment of the present disclosure provides a computer-readable storage medium, where the computer-readable storage medium stores a computer program, and when the computer program is executed by a processor, the method for establishing an SLB connection in the second aspect or the third aspect is implemented.

According to a ninth aspect, an embodiment of the present disclosure provides a computer program product, where the program product includes a computer program, and when the computer program is run by an electronic device, the electronic device is enabled to implement the method for establishing an SLB connection in the second aspect or the third aspect.

It can be understood that, for beneficial effect of the second aspect to the ninth aspect, reference may be made to related descriptions in the first aspect.

BRIEF DESCRIPTION OF DRAWINGS

FIG. 13A, FIG. 13B, and FIG. 13C are a flowchart of establishing an SLB connection between a first device and a second device according to another embodiment of the present disclosure;

DESCRIPTION OF EMBODIMENTS

Technical solutions provided in embodiments of the present disclosure are described below with reference to accompanying drawings.

It should be understood that, in descriptions of embodiments of the present disclosure, "/" indicates "or", unless otherwise specified. For example, A/B may indicate A or B. The term "and/or" in this specification describes only an association relationship between associated objects, and indicates that three relationships may exist. For example, A and/or B may indicate the following three cases: Only A exists, both A and B exist, and only B exists.

The terms "first" and "second" in embodiments are merely intended for a purpose of description, and shall not be understood as an indication or an implication of relative importance or an implicit indication of a quantity of indicated technical features. Therefore, a feature limited by "first" or "second" may explicitly or implicitly include one or more features. In descriptions of embodiments, "a plurality of" means two or more, unless otherwise specified.

An electronic device usually stores various applications, for example, a setting application, a multi-screen collaboration application, a screen projection application, an audio application, a video application, a gallery application, a camera application, a navigation application, a map application, an email client, and a game application. During running, each application may perform short-range wireless communication with a peer device based on a short-range wireless communication protocol architecture provided in embodiments.

Figure 1:
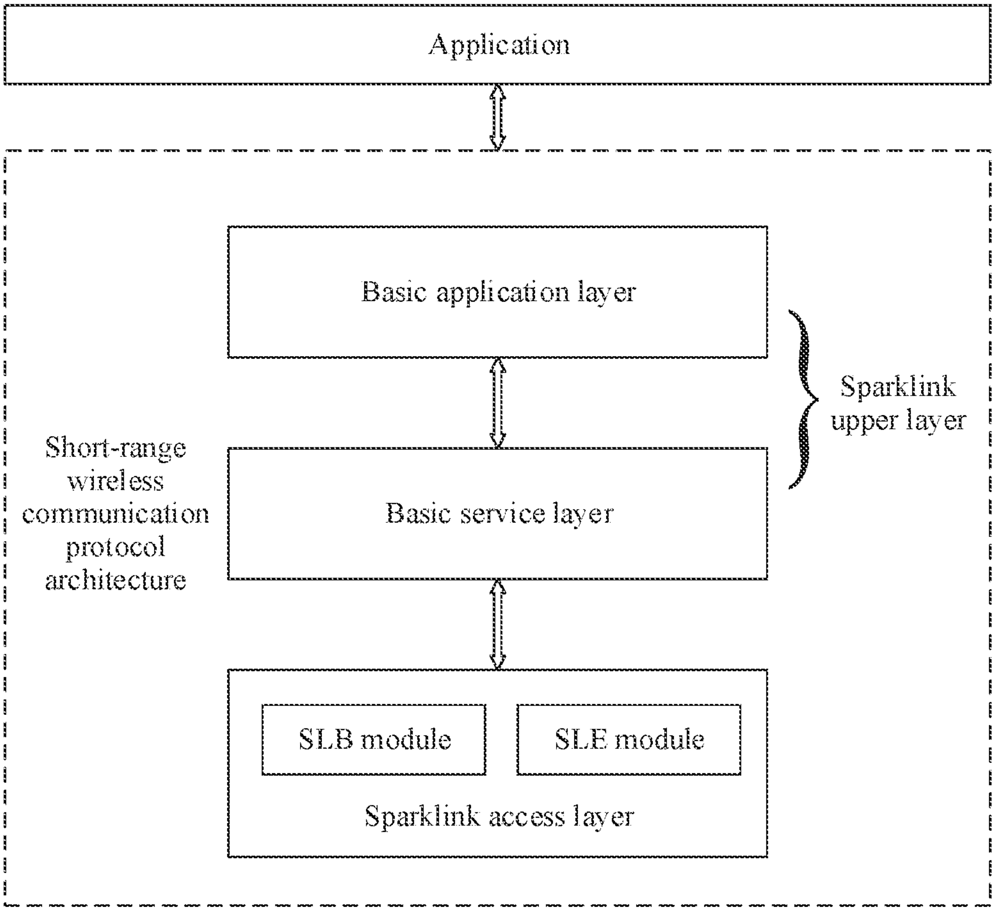
FIG. 1 is a first diagram of a short-range wireless communication protocol architecture according to an embodiment of the present disclosure.
Figure 2:
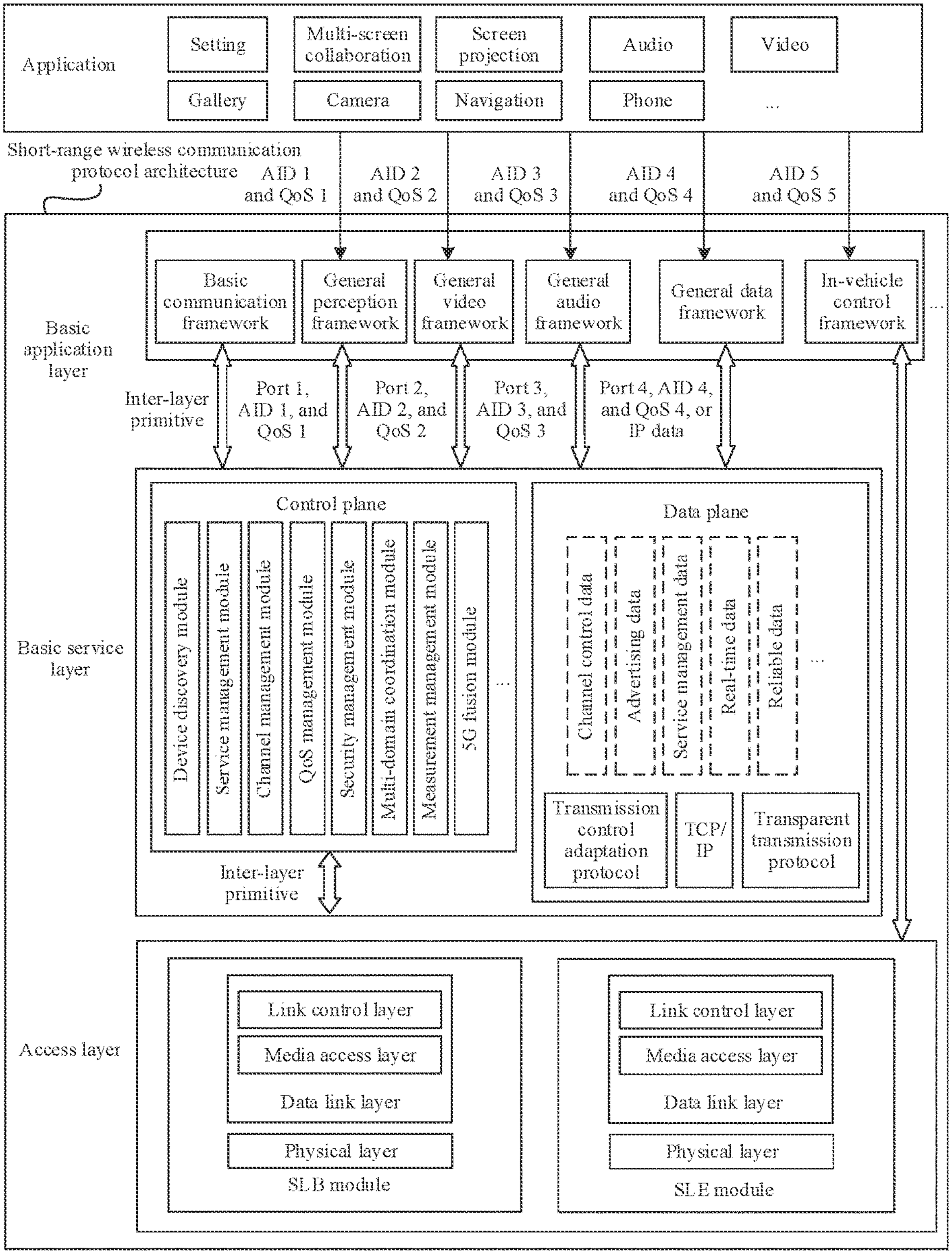
FIG. 2 is a second diagram of a short-range wireless communication protocol architecture according to an embodiment of the present disclosure.

FIG. 1 and FIG. 2 are diagrams of a short-range wireless communication protocol architecture according to an embodiment of the present disclosure. As shown in FIG. 1, the architecture includes a basic application layer, a basic service layer, and a sparklink access layer (which may also be referred to as an access layer). The basic application layer and the basic service layer may be collectively referred to as a sparklink upper layer. The sparklink access layer includes an SLB module and an SLE module. The sparklink upper layer may schedule the SLB module and the SLE module in a unified manner.

(1) Basic Application Layer

The basic application layer includes various general frameworks. To implement communication between different devices on different platforms, the basic application layer builds frameworks for various possible and general application scenarios. For example, as shown in FIG. 2, these frameworks may include general frameworks such as a basic communication framework, a general perception framework, a general video framework, a general audio framework, a general data framework, and an in-vehicle control framework. After receiving a service requirement delivered by an application, the basic application layer selects a corresponding general framework to process a corresponding service.

The basic communication framework is configured to set a device discovery/discovered mode (for example, an broadcast mode or a polling mode), set a filtering policy (for example, in an audio service scenario, device discovery is performed only on an electronic device that supports an audio device), set a discoverability level, and the like. In addition, the basic communication framework is further configured to select the SLB module and/or the SLE module for communication according to a service requirement of an application.

It should be understood that different applications usually have different service requirements, and the service requirements include an application identifier (AID) and quality of service (QoS). The QoS includes a bit rate, a delay, a sampling rate, a bit width, and the like. After detecting a service requirement of an application, the basic application layer can select, according to the service requirement, a corresponding functional module to process the service, and control the basic service layer to establish a service channel, or the like.

The general perception framework is configured to detect a user operation, battery level information of a device, signal strength, and the like. The user operation may include a screen touch operation, a mid-air control gesture, a voice control instruction, and the like. The signal strength may include SLB signal strength, SLE signal strength, and the like.

The general video framework is configured to process data related to a video service, for example, encode and decode video data.

The general audio framework is configured to process data related to an audio service, for example, encode and decode audio data.

The general data framework is configured to encrypt and decrypt data, or the like.

The in-vehicle control framework is configured to process data related to an in-vehicle control service.

(2) Basic Service Layer

The basic service layer includes a control plane and a data plane. The control plane includes functional modules such as a device discovery module, a service management module, a channel management module, a QoS management module, a security management module, a multi-domain coordination module, a measurement management module, and a fifth-generation (5G) fusion module. The data plane includes channel control data, broadcast data, service management data, real-time data, reliable data, and the like, and further includes a transmission control adaptation protocol, a Transmission Control Protocol/Internet Protocol (TCP/IP), a transparent transmission protocol, and the like. It should be noted that, some data (for example, channel control data in a dashed-line box in FIG. 2) of the data plane is usually not included in an initial protocol architecture, but is gradually generated and stored in a process in which an electronic device uses the protocol architecture.

The device discovery module is mainly configured to discover a peripheral device and announce, to the outside, information about a device on which the device discovery module is installed, and invoke an access layer capability to perform device discovery and being-discovered, and determine device information, and the like. In this embodiment, the device information includes a domain name, a media access control (MAC) address, a role, a device model, a device capability (for example, a supported wireless connection type and a supported communication protocol), and other information of a device.

During device discovery, the device discovery module may be specifically configured to advertise device information of the electronic device, and scan for an electronic device that meets a service requirement. It should be understood that, for a short-range wireless communication service, different service requirements usually correspond to different types of target electronic devices. For example, when a mobile phone performs screen projection, a device discovery module of the mobile phone needs to scan for a large-screen device with a screen projection and display function, for example, a television or a projector, and does not scan for another electronic device that cannot accept screen projection, for example, a mobile phone or a wireless headset.

In addition, in this embodiment, the device discovery module further supports mutual discovery between SLB and SLE. To be specific, during communication with a peer device by using the SLB access technology, the device discovery module can discover that the peer device enables an SLE communication function; or during communication with a peer device by using the SLE access technology, the device discovery module can discover that the peer device enables an SLB communication function.

The service management module is configured to provide an abstract data structure model for transmission of control instructions and small data at the basic application layer, and provide a method, for example, reading, writing, notifying, or indicating, for operating a data structure.

The channel management module is configured to manage a transmission channel at the basic service layer, including managing establishment, maintenance, and release of the transmission channel, and support data transmission through a default transmission channel, or dynamic allocation of a transmission channel for data transmission.

In addition, the channel management module is further configured to manage establishment and maintenance of a cross-layer mapping relationship, including managing a mapping relationship between a port of the basic application layer and a transmission channel identifier (TCID) of the basic service layer, and a mapping relationship between the TCID of the basic service layer and a logical channel identifier (LCID) of the access layer.

The QoS management module is configured to manage a static QoS request table of a service, and negotiate with a peer device upon QoS. Different services usually have different static QoS request tables. The static QoS request table includes parameters such as a transmission delay, a bit rate, a retransmission rate, a transmission bandwidth requirement, a service type, and a bit width. QoS management can alleviate problems such as a network delay and network congestion during communication between the electronic device and the peer device, and improve communication quality.

The security management module is configured to manage a secure connection at the basic service layer, including identity authentication, air interface communication security protection, a key update, privacy protection, application layer transmission security, a password requirement, secure storage of device information, secure execution, security protection, security management, and the like.

The multi-domain coordination module is configured to: in a scenario in which the electronic device is in a plurality of communication domains, control and implement information exchange between the communication domains, to avoid mutual interference between the plurality of domains, and protect load balancing between the domains. In the SLB access technology, the electronic device includes a grant node device (G node device) and a terminal node device (T node device). A communication system jointly constituted by a G node device and all T node devices connected to the G node device is referred to as a communication domain. When the electronic device is in a plurality of communication domains, the multi-domain coordination module needs to manage establishment of interaction channels between a plurality of G node devices corresponding to the plurality of communication domains, maintain a list of neighboring G node devices and basic information, and coordinate resources between the plurality of domains to perform joint positioning and mobility management and implement load balancing.

The measurement management module is configured to measure a distance between the local device and another electronic device, an orientation of the local device relative to the another electronic device, and the like based on a received signal strength indicator (RSSI) and a preset algorithm. In addition, the measurement management module is further configured to configure a measurement cycle, report a measurement event and a measurement result to the basic application layer, schedule a measurement resource, control measurement power, and the like.

The 5G fusion module is configured to establish a channel with a 5G remote management capability, and obtain a device with a cellular 5G remote control function through an authentication mechanism. To be specific, the 5G fusion module enables all nodes to have a capability of being perceived and controlled by a 5G edge core network. For example, when a G node device has a capability of connecting to a core network but a T node device does not have a capability of connecting to the core network, the 5G core network may deliver a control instruction to the T node device through the G node device, so that the T node device can also be controlled by the 5G core network.

(3) Sparklink Access Layer

The sparklink access layer includes the SLB module and the SLE module. The SLB module may also be referred to as an SLB access layer, and the SLE module may also be referred to as an SLE access layer.

The SLB module performs communication by using the SLB access technology. The SLB access technology has a high-bandwidth communication capability, and may carry a high-bandwidth service, for example, a wireless screen projection service or a video call service. During communication, a data throughput is high, and a data transmission speed is high. However, the SLB access technology has high power consumption, and an access process takes a long time.

In the SLB access technology, the electronic device includes a G node device and a T node device, and it is specified that the G node device may send broadcast and the T node device may scan for information. In addition, during establishment of an SLB connection between the G node device and the T node device, only the T node device is allowed to discover the G node device through scanning and send a connection request to the G node device to connect to the G node device. However, the G node device is not allowed to send a connection request to the T node device.

In an example, when a large-screen device (for example, a television) is a G node device and a mobile phone is a T node device, the large-screen device automatically advertises SLB connection information to the outside after an SLB communication function is enabled. When the mobile phone has a service requirement for screen projection, the mobile phone starts to scan for surrounding G node devices, receives SLB connection information advertised by the G node devices, and displays a device scanning result (for example, a device model and a device name) based on the SLB connection information. In response to an operation of selecting, by a user, the large-screen device from the scanning result, the mobile phone sends a connection request to the large-screen device, to establish an SLB connection to the large-screen device. However, the large-screen device is not allowed to send a connection request to the mobile phone.

The SLE module performs communication by using the SLE access technology. Communication by using the SLE access technology has a low-power communication capability. When the SLE module is in an idle state (to be specific, is not connected to another device), the SLE module may advertise device information and data in three fixed broadcast channels, so that the SLE module can be quickly discovered and connected. This helps save power for the device. However, the SLE access technology supports low bandwidth, and a data transmission speed is low. Therefore, the SLE access technology is usually used to process a service with a low bandwidth requirement, for example, an audio play service based on a wireless headset, or a service of controlling a smart home appliance by a mobile phone.

The SLB module and the SLE module each include a data link layer and a physical layer. The data link layer includes a link control layer and a media access layer. The link control layer provides services for the basic service layer.

At a transmit end, the link control layer is configured to perform necessary operations, such as numbering (for example, adding a sequence number (SN)), segmentation, encryption, and integrity protection, on upper-layer service data (namely, data at the basic service layer), and send a generated link control (LC) protocol data unit (PDU) to the media access layer. The media access layer mainly performs multiplexing and encapsulation on different LC PDUs based on a quantity of scheduled resources, to generate a MAC protocol data unit (PDU).

At a receive end, the media access layer is responsible for decapsulating data and delivering decapsulated data to different logical channels. The link control layer may perform necessary operations, such as decryption, reassembly, and sorting, on the data, and deliver service data to the basic service layer in sequence.

The physical layer is configured to provide a data transmission service for the data link layer, and specifically includes the following functions: checking correctness of transmitted information and indicating a check result to the data link layer, forward error correction (FEC) encoding/decoding for transmitted information, hybrid automatic repeat request (HARQ) soft combination, rate matching between transmitted information and a corresponding physical resource, a mapping between encoded transmitted information and a corresponding physical resource, modulation and reception of physical layer control information and physical layer data information, frequency and time synchronization, measuring a radio feature and indicating a measurement result to the data link layer, multiple-input multiple-output antenna processing, beamforming, radio frequency processing, and the like.

Based on the foregoing short-range wireless communication protocol architecture, the electronic device may flexibly use different access technologies (the SLB access technology and/or the SLE access technology) to communicate with a peer device according to different service requirements of applications.

Figure 3:
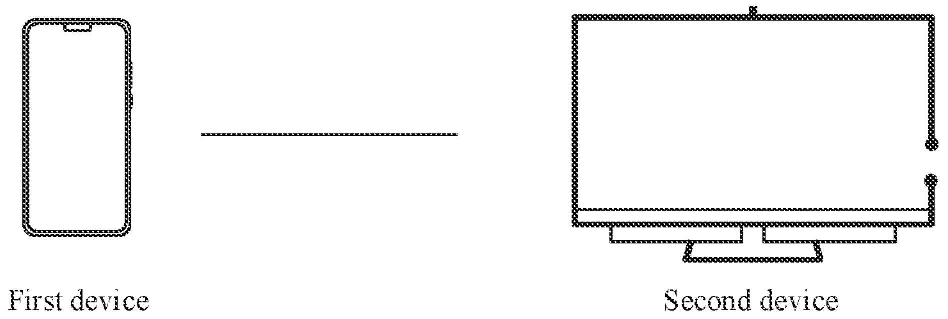
FIG. 3 is a diagram of an architecture of a short-range wireless communication system to which a method for establishing an SLB connection according to embodiments of the present disclosure is applicable.

FIG. 3 is a diagram of an architecture of a short-range wireless communication system to which a method for establishing an SLB connection according to embodiments of the present disclosure is applicable. As shown in FIG. 3, the system includes a first electronic device (a first device) and a second electronic device (a second device). Both the first device and the second device are configured with the short-range wireless communication protocol architecture shown in FIG. 1 and FIG. 2, and can communicate with each other based on the protocol architecture by using an SLB access technology and/or an SLE access technology.

In this embodiment, the electronic device may be an electronic device in various fields, for example, a large-screen device, an artificial intelligence (AI) speaker, a high fidelity (Hi-Fi) speaker, a temperature sensor, or a humidity sensor in the smart home field; a mobile phone, a tablet computer, a wearable device, an augmented reality (AR)/virtual reality (VR) device, a notebook computer, an ultra-mobile personal computer (UMPC), a netbook, or a personal digital assistant (PDA) in the intelligent terminal field; or a mechanical arm, a camera, a joystick, a monitor, a logistics vehicle, or a smart shelf in the intelligent manufacturing field. A specific type of the electronic device is not limited in embodiments of the present disclosure.

Figure 4A:
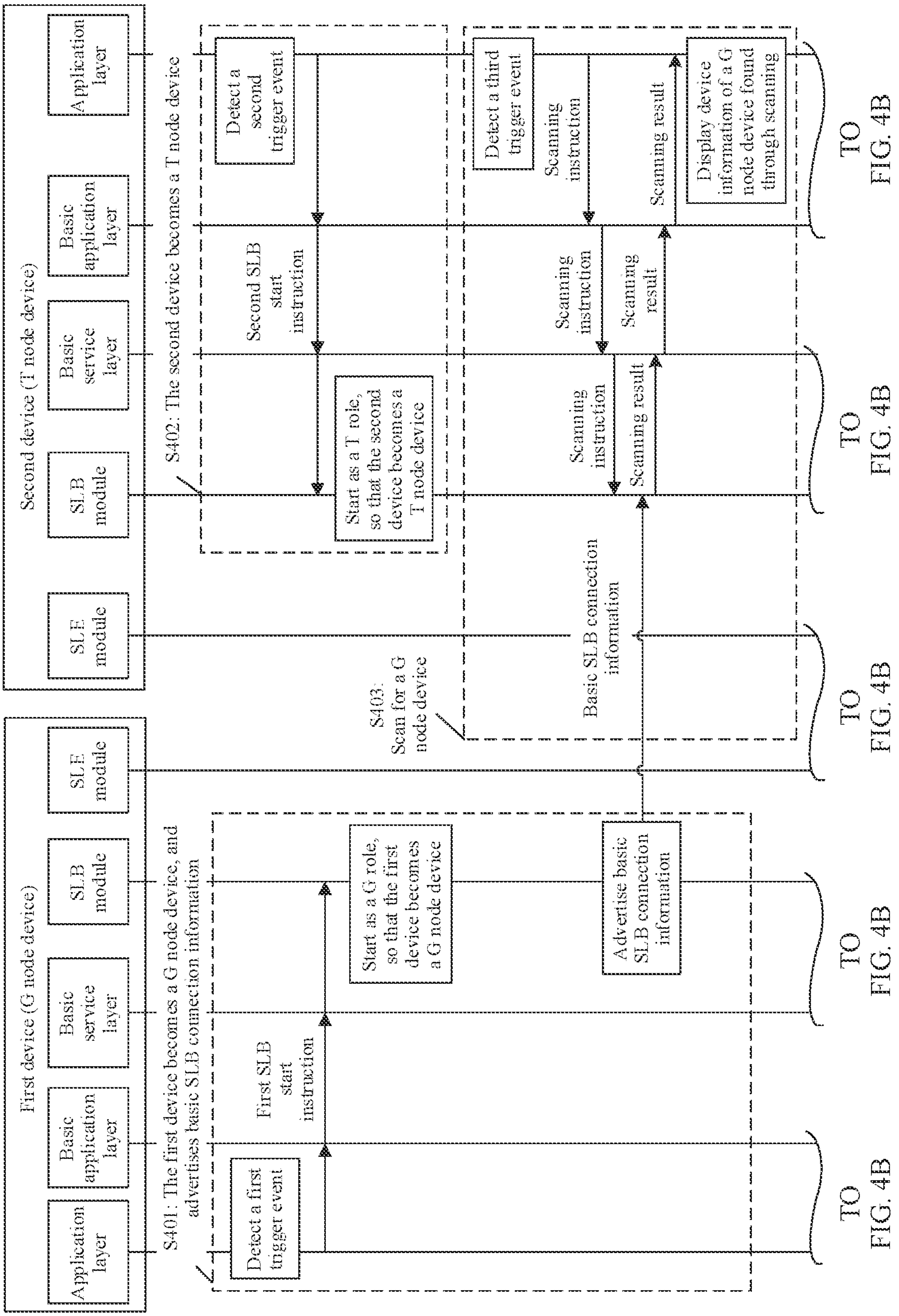
FIG. 4A and FIG. 4B are a flowchart of establishing an SLB connection between a first device and a second device according to an embodiment of the present disclosure.
Figure 4B:
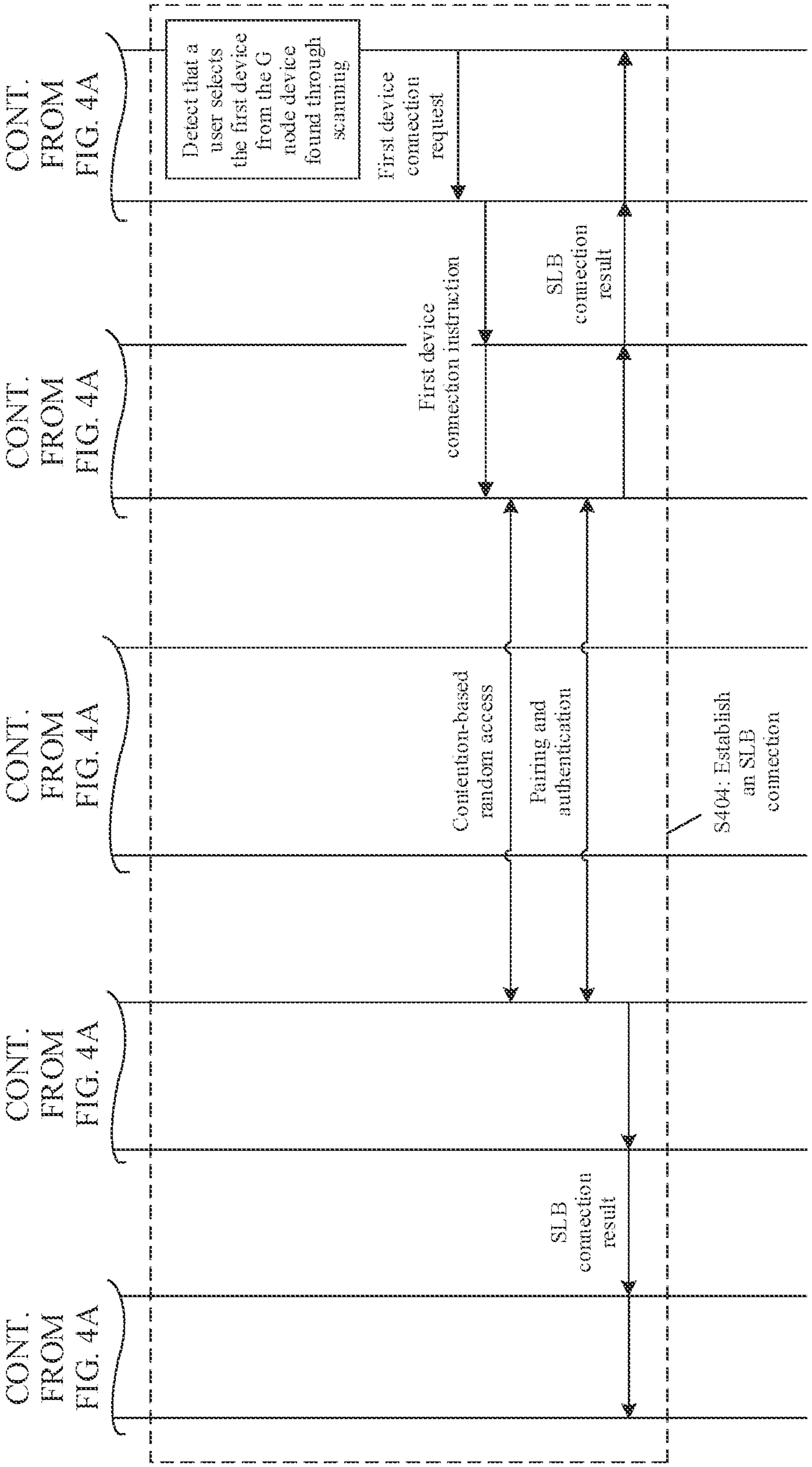

FIG. 4A and FIG. 4B are a flowchart of establishing an SLB connection between a first device and a second device according to an embodiment of the present disclosure. Specifically, the following steps S401 to S404 are included.

S401: The first device becomes a G node device, and advertises SLB connection information.

First, it should be noted that different default roles may be set for different electronic devices in an SLB access technology. Default roles of some electronic devices are a grant role (G role), and the electronic devices serve as G node devices by default in an SLB connection process. Default roles of some electronic devices are a terminal role (T role), and the electronic devices serve as T node devices by default in an SLB connection process.

In a possible implementation, the default role may be determined based on an input/output status of the electronic device. The input/output status includes: whether the electronic device supports information input by using an apparatus such as a mouse, a keyboard, or a screen, whether the electronic device supports information output by using an apparatus such as the screen or a speaker, or the like. For example, a default role of a device facilitating information input by a user, for example, a mobile phone or a tablet computer, is usually a T role, and the device serves as a T node device by default in an SLB connection process; and a default role of a device not facilitating information input by a user, for example, a large-screen device or a smart speaker, is usually a G role, and the device serves as a G node device by default in an SLB connection process.

In addition, the electronic device may alternatively determine or reset a role of the electronic device according to a user instruction. For example, the default role of the electronic device is reset in a control center or on a setting interface of the electronic device.

Figure 5:
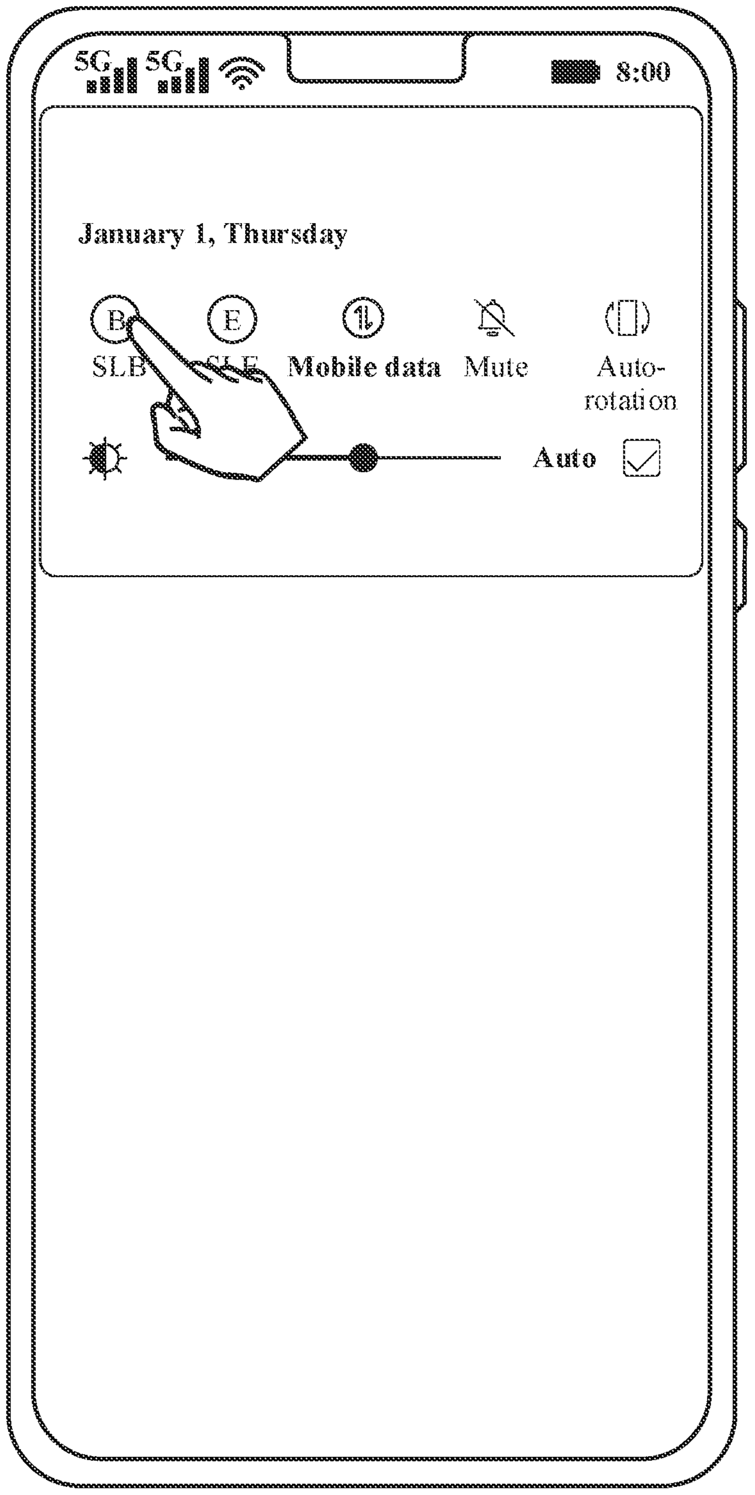
FIG. 5 is a first diagram of device control according to an embodiment of the present disclosure.

Based on the foregoing content, in this embodiment, after detecting a first trigger event, the first device (for example, a large-screen device) may wake up an SLB module as a G role. For example, the first trigger event may be that the first device is started, or an SLB communication function of the first device is enabled according to a user instruction (refer to FIG. 5). Specifically, after detecting the first trigger event, an application on the first device sends a first SLB start instruction to the SLB module sequentially through a basic application layer and a basic service layer, where the first SLB start instruction is used to instruct the SLB module to start as the G role. After the SLB module of the first device starts as the G role, the first device becomes a G node device.

After the first device becomes a G node device, the SLB module of the first device starts to advertise the SLB connection information. The SLB connection information is used by a T node device to discover and connect to the G node device. In this embodiment, the SLB connection information includes the following (1) to (4).

(1) First Training Signal (FTS)

(2) Secondary Training Signal (STS)

Both the FTS and the STS are signals used for time synchronization in the SLB access technology. The FTS is a coarse synchronization signal, and the STS is a fine synchronization signal. One FTS and one STS constitute a group. In each group of signals, a signal that first appears in time domain is an FTS, and a signal that appears later in time domain is an STS. The FTS is a ZC (Zadoff-Chu) sequence with a root index of 1 or 40 and a length of 39. The STS is a ZC sequence with a root index ranging from 1 to 20 and a length of 39.

(3) Broadcast Information

The broadcast information has a total of 63 bits (bit) and is transmitted in a broadcast channel (BCH). The broadcast information carries SLB physical layer configuration parameters, which are specifically shown in Table 1. The second device (a T node device) needs to use these parameters to receive other system information, for example, communication domain system information.

TABLE 1

Structure of the broadcast information

| | Quantity of bits | |
|---|---|---|
| Broadcast information | 1 | Cyclic prefix information. 0 indicates a normal cyclic prefix, and 1 indicates an extended cyclic prefix. |

TABLE 1-continued

Structure of the broadcast information

| | Quantity of bits | |
|---|---|---|
| | 1 | Whether a radio frame structure includes SLB indication information, including 0 and 1. 0 indicates that no SLB indication information is included, and 1 indicates that SLB indication information is included. |
| | 4 | A subframe ratio. |
| | 16 | A super frame number, indicating a super frame number of the 1st one of four consecutive super frames for sending the broadcast information. |
| | 3 | An indication value for a start location of the broadcast information in a super frame. Six radio frames serve as a granularity, and the start location of the broadcast information is six times the indication value. |
| | 2 | A quantity N of symbols of a common resource for G link control information, where N includes 00, 01, and 11, indicating 4, 8, and 12 symbols respectively. 11 is reserved. The common resource is adjacent to the STS. |
| | 1 | Broadcast information or communication domain system information change indication information, including 0 and 1. 0 indicates that the broadcast information and the communication domain system information do not change within a next cycle. 1 indicates that the broadcast information and the communication domain system information change within a next cycle. |
| | 2 | A change cycle of the broadcast information or the communication domain system information, including 00, 01, and 11. 00 indicates that the change cycle is 512 super frames. 01 indicates that the change cycle is 1024 super frames. 11 indicates that the change cycle is 4096 super frames. |
| | 9 | A reserved bit. In a current SLB protocol version, all reserved bits are 0. |
| | 24 | A cyclic redundancy check sequence. |
| Total | 63 | |

(4) Communication Domain System Information

The communication domain system information is an information element in an SLB protocol. The second device needs to obtain communication domain system information of the first device to obtain an access resource and other information, to establish an SLB connection to the first device. In this embodiment, a structure of the communication domain system information may be shown as follows:

```
        DomainSysInfo-IEs ::= SEQUENCE {
                domainName                              DomainName
                OPTIONAL,           -- Need OR
                domainID                                    DomainID
                    OPTIONAL,           -- Need OR
                carrierChannelConf                      CarrierChannelConf,
                nonContention AccessResourceSYS NonContentionAccessResourceSYS,
        OPTIONAL,           -- Need OR
                contentionAccessResourceSYS
        Contention AccessResourceSYS,
                p0-NominalConfig                        P0-NominalConfig,
                ack-ResourceSetConf                     ACK-
ResourceSetConf,
                domainCoordination                      DomainCoordination,
            OPTIONAL,           -- Need OR
                accessControl                           BIT STRING (SIZE
(4)),       OPTIONAL,           -- Need OR
                keyAlgNegotiation                       BIT STRING (SIZE
(32)),
                testModeIndication                      ENUMERATED {true,
false},     OPTIONAL,           -- Need OR
                nonCriticalExtension                SEQUENCE { }
                OPTIONAL            -- Need OR
        }
```

S402: The second device becomes a T node device.

After detecting a second trigger event, the second device (for example, a mobile phone) may wake up an SLB module as a T role. For example, the second trigger event may be that the second device is started, or a user enables an SLB communication function of the second device (refer to FIG.

5). Specifically, after detecting the second trigger event, an application on the second device sends a second SLB start instruction to the SLB module sequentially through a basic application layer and a basic service layer, where the second SLB start instruction is used to instruct the SLB module to start as the T role. After the SLB module of the second device starts as the T role, the second device becomes a T node device.

S403: The second device scans for a G node device.

After detecting a third trigger event, the application on the second device controls the SLB module of the second device to start to scan for a surrounding G node device.

Figure 6:
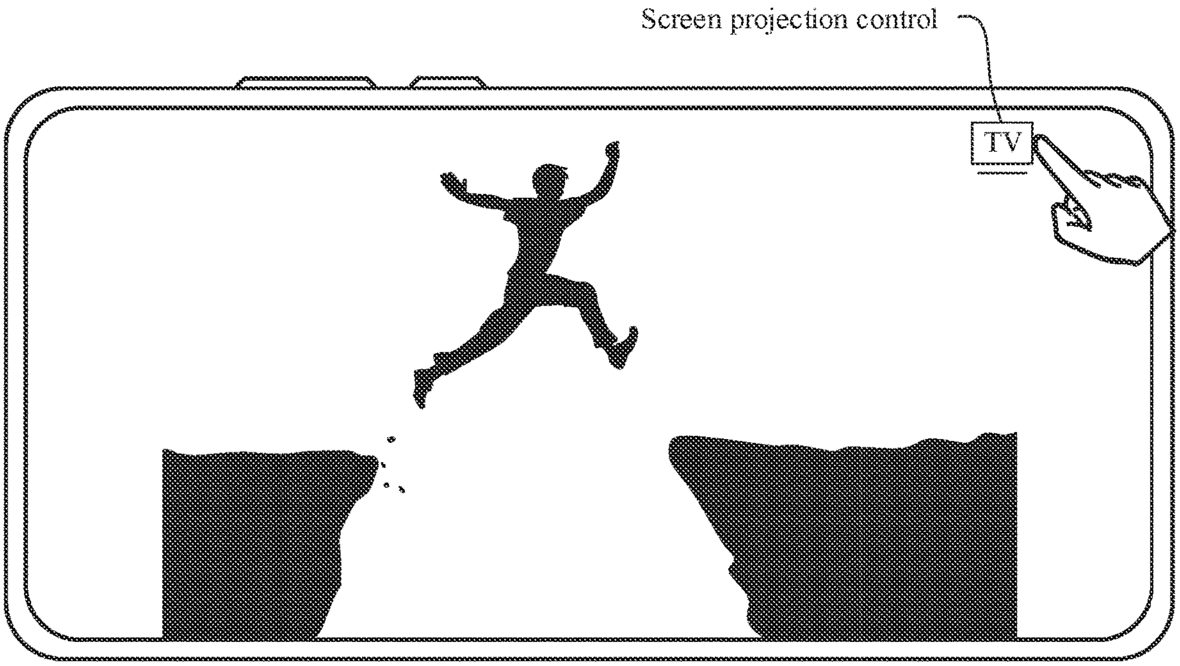
FIG. 6 is a second diagram of device control according to an embodiment of the present disclosure.

In some embodiments, the third trigger event is that the second device detects an operation of controlling, by a user, scanning for a G node device. For example, as shown in FIG. 6, in a process in which the second device plays a video, the third trigger event is an operation performed by a user on a screen projection control on a video play interface.

In some other embodiments, after becoming a T node device, the second device automatically scans for a surrounding G node device at an interval of preset duration. Based on this, the third trigger event is that the preset duration elapses.

Figure 7:
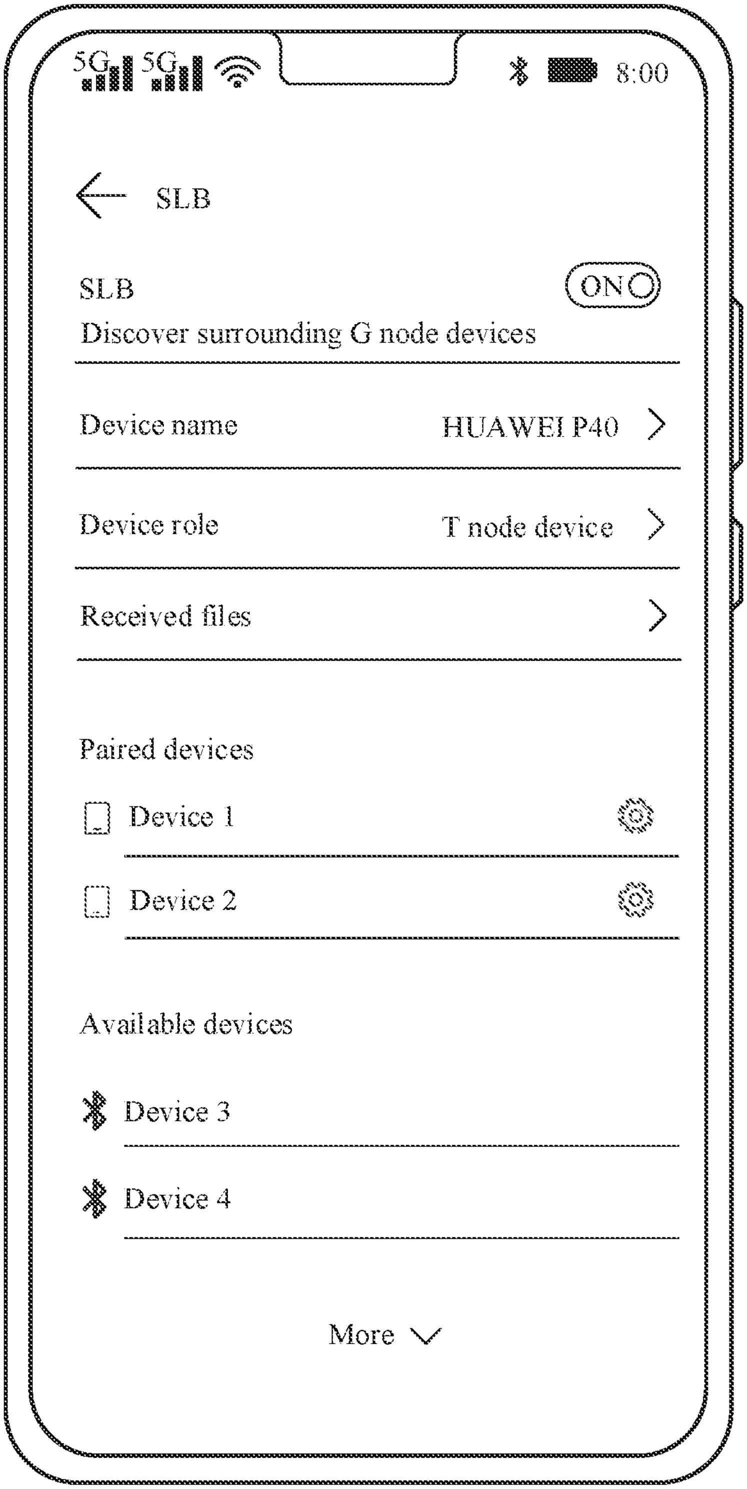
FIG. 7 is a third diagram of device control according to an embodiment of the present disclosure.

In some other embodiments, the third trigger event is that the second device displays an SLB setting interface or the like. For example, as shown in FIG. 7, after the second device displays the SLB setting interface, the second device starts to scan for a G node device, and displays, in a list of available devices, device information (for example, a device name and a device model) of a G node device found through scanning.

Specifically, after detecting the third trigger event, the application on the second device sends a scanning instruction to the SLB module sequentially through the basic application layer and the basic service layer, where the scanning instruction is used to control the SLB module to scan for and discover a G node device. After receiving the scanning instruction, the SLB module starts to scan for a surrounding G node device, and receives SLB connection information advertised by the surrounding G node device. Then the SLB module reports, as a scanning result to the application sequentially through the basic service layer and the basic application layer, device information (for example, a device name and a device model) carried in the received SLB connection information. Finally, the application displays, on a display interface of the second device based on the scanning result, the device information of the G node device found through scanning.

That the second device receives SLB connection information includes the following content (1) to (3) in sequence.

(1) The Second Device Receives the FTS and the STS, and Implements Downlink Synchronization With the First Device Based on the FTS and the STS Based on the foregoing descriptions, it can be learned that there are two types of FTSs whose root indexes are 1 and 40 respectively, and there are 20 types of STSs whose root indexes are 1 to 20 respectively. Therefore, in a process of receiving the FTS and the STS, the SLB module of the second device not only needs to receive an broadcast signal, but also needs to find the FTS and the STS from the received broadcast signal (received signal), and further detect specific types of the FTS and the STS.

In this embodiment, the SLB module of the second device may detect the specific types of the FTS and the STS through correlation processing. To be specific, the second device locally prestores or generates all types of FTSs and STSs, and after obtaining the received signal, separately performs correlation processing on the received signal and all the types of local FTSs and STSs. If a height of a correlation peak between a part of the received signal and a preset FTS or STS exceeds a threshold, it is determined that a type of the part of the received signal is the same as that of the preset signal.

For example, in a process of receiving the FTS, the SLB module of the second device needs to perform correlation processing on the received signal and each of local FTSs whose root indexes are 1 and 40. If a height of a correlation peak between a part of the received signal and an FTS whose root index is 1 exceeds a threshold, it is determined that the part of the received signal is the FTS whose root index is 1. If a height of a correlation peak between a part of the received signal and an FTS whose root index is 40 exceeds a threshold, it is determined that the part of the received signal is the FTS whose root index is 40. It can be understood that the second device needs to perform correlation processing once or twice to detect a type of the FTS.

For another example, in a process of receiving the STS, the SLB module of the second device first finds the STS from the received signal based on a location of the correlation peak of the FTS, and then further detects a type of the STS. When detecting the type of the STS, the SLB module of the second device needs to perform correlation processing on the found STS and each of local STSs whose root indexes are 1 to 20. If a height of a correlation peak between the STS and an STS whose root index is k exceeds a threshold, it is determined that the STS is the STS whose root index is k. k is any value ranging from 1 to 20, and k is an integer. It can be understood that the second device needs to perform correlation processing for 1 to 20 times to detect the type of the STS.

The SLB module of the second device may implement downlink synchronization between the SLB module of the second device and the SLB module of the first device based on the FTS and the STS. The downlink synchronization means that the T node device synchronizes with the G node device based on a signal (including the FTS and/or the STS) sent by the G node device.

After completing downlink synchronization with the first device (the G node device), the second device (the T node device) may receive, at a corresponding time-frequency domain location, the broadcast information and the communication domain system information that are sent by the first device.

(2) The Second Device Receives the Broadcast Information

Figure 8:
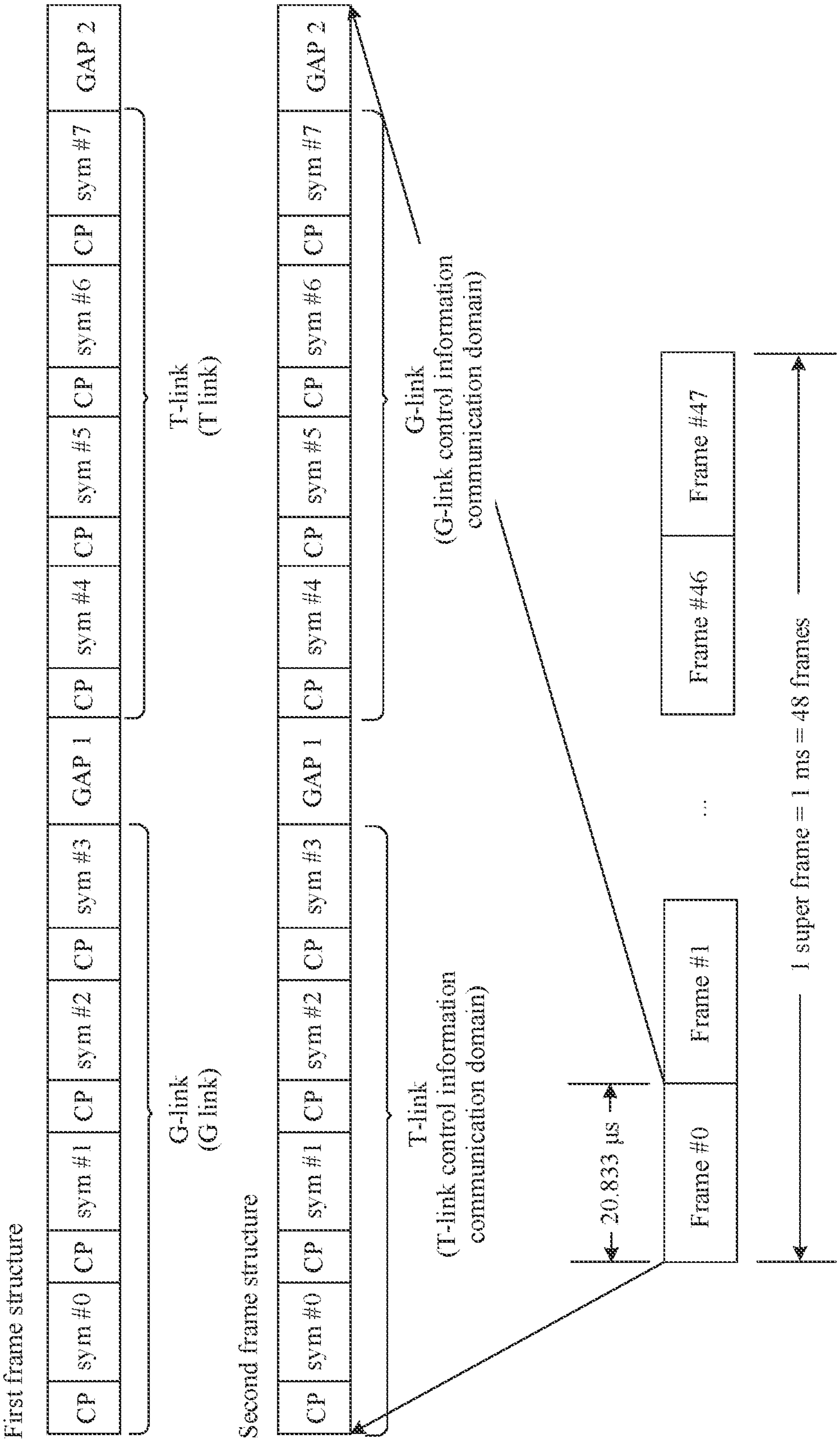
FIG. 8 is a diagram of a structure of a super frame according to an embodiment of the present disclosure.

As shown in FIG. 8, in time domain, 1 millisecond (ms) is a super frame, one super frame includes 48 radio frames (Frames), a length of each radio frame is 20.833 microseconds (μs), and each radio frame includes eight symbols (sym). FIG. 8 provides two frame structures of a radio frame only as examples, including a first frame structure and a second frame structure. In the first frame structure, the first four symbols (for example, a sym #0 to a sym #3) are a G-link, and the last four symbols (for example, a sym #4 to a sym #7) are a T-link. In the second frame structure, the first four symbols (for example, a sym #0 to a sym #3) are a T-link, and the last four symbols (for example, a sym #4 to a sym #7) are a G-link.

The G link is a resource used by a G node device in communication domain to send information and used by a T node device to receive information. The T link is a resource used by a T node device to send information and used by a G node device to receive information. The information includes a physical layer signal, physical layer control information, physical layer data information, and the like.

Figure 9:
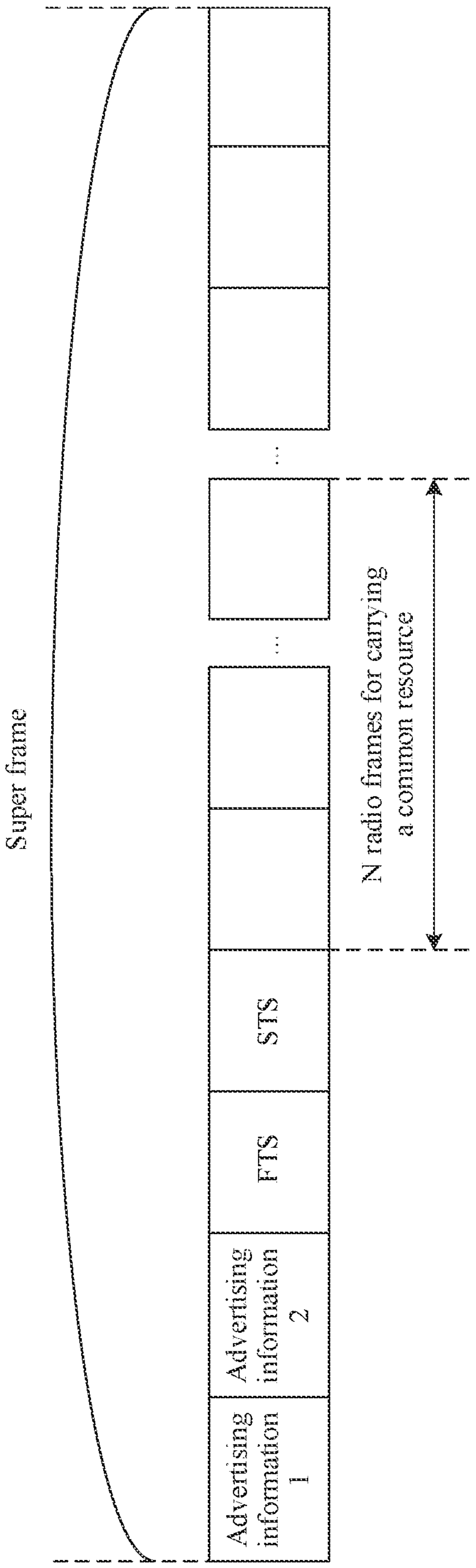
FIG. 9 is a diagram of a location of a radio frame carrying a time-frequency resource according to an embodiment of the present disclosure.

The SLB module of the first device (namely, the G node device) transmits the broadcast information by using eight symbols (specifically, system overhead symbols) of four consecutive super frames, and the broadcast information occupies two symbols in each super frame. The two symbols are the following symbols in a super frame: the last system overhead symbol of the $1^{st}$ radio frame preceding a location of a radio frame in which the FTS is located, and the last system overhead symbol of the $2^{nd}$ radio frame preceding the location of the radio frame in which the FTS is located. In an example, as shown in FIG. 9, the two symbols are the last system overhead symbol of a radio frame in which broadcast information 2 is located and the last system overhead symbol of a radio frame in which broadcast information 1 is located.

Figure 10:
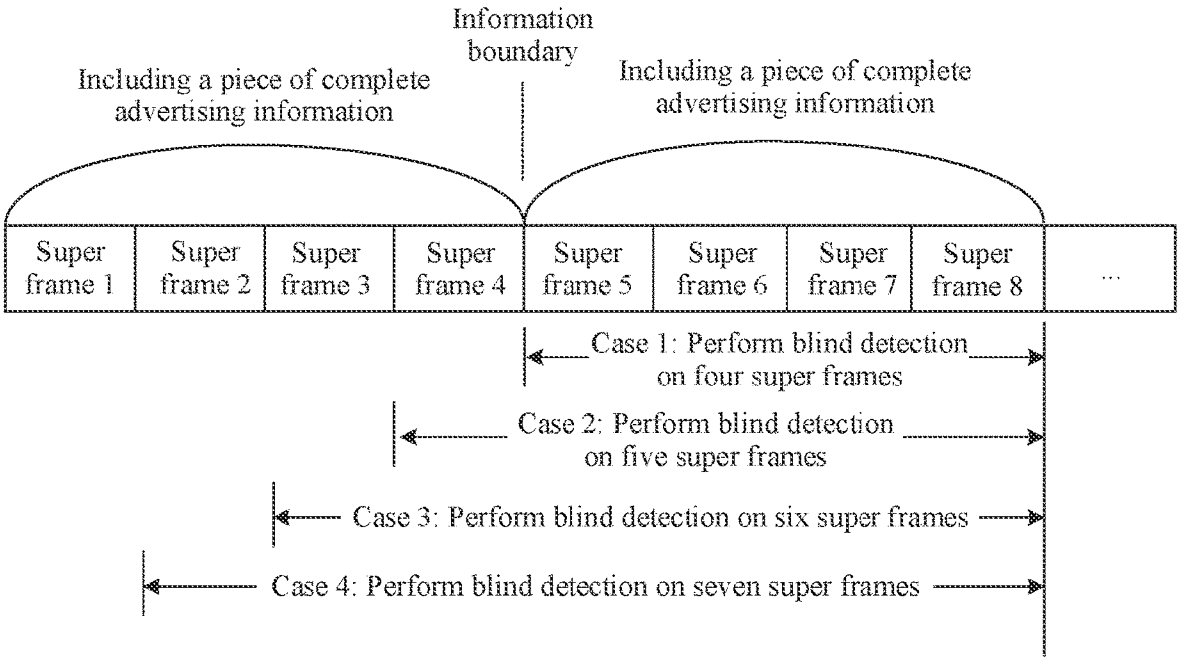
FIG. 10 is a diagram of a case in which an electronic device performs blind detection on broadcast information according to an embodiment of the present disclosure.

Because the SLB module of the first device needs to use four super frames to send a piece of complete broadcast information, as shown in FIG. 10, the SLB module of the second device needs to receive at least four complete super frames to obtain complete broadcast information through blind detection. Considering a scenario in which a blind detection operation crosses an information boundary, the SLB module of the second device needs to receive a maximum of seven complete super frames to obtain complete broadcast information through blind detection.

(3) The Second Device Receives the Communication Domain System Information

The communication domain system information is sent by the first device (namely, the G node device) through broadcast. After successfully receiving the broadcast information, the second device may continue to receive the communication domain system information based on a parameter carried in the broadcast information.

Specifically, the second device receives the communication domain system information based on an broadcast cycle for the communication domain system information and a location of a time-frequency domain resource that carries the communication domain system information.

The broadcast cycle for the communication domain system information is 64, 128, 256, or 512 super frames, and the cycle parameter is carried in the communication domain system information. However, in a process of receiving the communication domain system information, the second device does not know a specific value of the broadcast cycle for the communication system information. Therefore, the second device needs to perform blind detection on the communication domain system information based on a minimum broadcast cycle (to be specific, at least every 64 super frames), and a blind detection process takes a long time.

The location of the time-frequency domain resource that carries the communication domain system information is indicated by system control information, and the system control information is carried in a common resource in a control information transmission resource of a G link in a radio frame. One super frame has only one common resource. As shown in FIG. 9, a location of the common resource starts from the $1^{st}$ radio frame after a radio frame carrying the STS, and ends at the $N^{th}$ radio frame, where N=4, 8, or 12, and N is indicated in the broadcast information. In addition, the last system overhead symbol of each of the N radio frames is used in the common resource. Because the system control information has a length of 60 bits and occupies four or eight symbols, the system control information needs to occupy four or eight radio frames.

After detecting the STS and correctly receiving the broadcast information, the second device (namely, the T node device) may deduce the location of the common resource in the super frames. The common resource may carry any one of second-type dynamic data scheduling resource indication information with a length of 69 bits, system control information with a length of 60 bits, and random access response control information with a length of 60 bits. Therefore, the second device needs to perform blind detection on the common resource separately based on a length of 60 bits and a length of 69 bits, to determine a type of information carried in the common resource. Four or eight symbols are used by the system control information, every two symbols are one resource block, and the second device performs blind detection on the system control information by using a resource block as a unit (to be specific, the system control information occupies two or four resource blocks). Therefore, during blind detection on the system control information, the electronic device needs to successfully perform blind detection for a maximum of four times based on each of the length of 60 bits and the length of 69 bits, in other words, successfully perform blind detection for a maximum of eight times in total, to detect the system control information from the common resource. After obtaining the system control information carried in the common resource, the second device may obtain, from the system control information, the location of the time-frequency domain resource that carries the communication domain system information, and detect the communication domain system information at the location of the time-frequency domain resource based on the broadcast cycle for the communication domain system information.

It should be noted that, during blind detection by the second device, the blind detection may succeed, or the blind detection may fail. That the blind detection succeeds means that the second device finds needed information (for example, the system control information) through detection. That the blind detection fails means that the second device does not find needed information (for example, the system control information) through detection.

After successfully receiving the communication domain system information, the second device can initiate a synchronous connection to the first device based on the broadcast information and the communication domain system information, to establish an SLB connection between the first device and the second device. For details, refer to S404.

S404: The second device establishes an SLB connection to the first device.

Based on a definition of the SLB access technology, only a T node device can initiate a connection to a G node device. Therefore, in this embodiment, in a process of establishing the SLB connection between the first device and the second device, the second device (the T node device) initiates contention-based random access. Details are described below.

On the second device side, after detecting that a user selects the first device from the G node device found through scanning, the application sends a first device connection request to the basic application layer. In response to the first device connection request, the basic application layer delivers a first device connection instruction to the SLB module through the basic service layer, to instruct the SLB module to establish an SLB connection to the first device.

After receiving the first device connection instruction, the SLB module of the second device initiates contention-based random access to the SLB module of the first device. A four-way handshake process of the contention-based random access includes the following content (1) to (4).

(1) The SLB module of the second device sends a first message (Msg1) to the SLB module of the first device, where content of the first message is mainly a random access request.

In this embodiment, the SLB module of the second device randomly selects a physical layer identifier from a range of [contentionPhysID-starting, contentionPhysID-ending] indicated by an information element ContentionAccessResource (in the obtained communication domain system information), and randomly selects an access resource from a contention-based access resource indicated by the information element ContentionAccessResource. The SLB module of the second device sends the physical layer identifier to the SLB module of the first device on the contention-based access resource, to indicate, to the SLB module of the first device, that the random access request exists.

(2) The SLB module of the first device sends a second message (Msg2) to the SLB module of the second device, where the second message is a random access response (RAR), and is mainly used by the SLB module of the first device to configure, for the SLB module of the second device by using G link control information, a resource for sending more information, and send scheduling signaling by using G link control signaling. A cyclic redundancy check (CRC) code of the scheduling signaling is scrambled based on the physical layer identifier of the contention-based access resource and the physical layer identifier of the SLB module of the second device (the T node device).

(3) The SLB module of the second device sends an XRC setup request (XRCSetupRequest) message on the resource configured in the Msg2, where the request includes an identifier used for conflict resolution, and the identifier is a globally unique MAC layer identifier, and may uniquely identify a T node device that initiates an access request. In addition, optionally, the SLB module of the second device may report capability information of the SLB module of the second device to the SLB module of the first device by using XRC signaling on the resource configured in the Msg2, and report a data amount at a link control layer in a form of a MAC control element (CE).

(4) The SLB module of the first device sends a fourth message (Msg4) to the SLB module of the second device, where the fourth message is an XRC setup (XRCSetup) message. The XRC setup message carries the identifier that is used for conflict resolution and that is reported by the SLB module of the second device. The SLB module of the second device receives a response message, and determines, based on the identifier for conflict resolution, whether access succeeds.

After completing contention-based random access, the SLB module of the first device and the SLB module of the second device need to perform pairing and authentication. After the pairing and the authentication are completed, the first device and the second device successfully establish the SLB connection, and may transmit service data.

After the first device and the second device are successfully paired and authenticated, the SLB module of the first device and the SLB module of the second device each report an SLB connection result to a respective application layer through the basic service layer and the basic application layer, to notify the application layer that the SLB connection is completed.

To sum up, in the foregoing steps S401 to S404, the SLB connection may be established between the first device and the second device, to process a high-bandwidth service initiated by the second device to the first device.

For example, a mobile phone is connected to a speaker to play high-definition audio. In some embodiments, the speaker becomes a G node device after being started, and advertises SLB connection information to the outside. The mobile phone becomes a T node device after being started. After the mobile phone enters a setting interface, a setting application on the mobile phone delivers a scanning instruction to an SLB module sequentially through a basic application layer and a basic service layer. The SLB module performs a scanning operation, receives SLB connection information, and reports, for display, device information (for example, a device name and model) in a scanning result to the setting application sequentially through the basic service layer and the basic application layer, so that a user can view an electronic device supporting the SLB technology around the mobile phone. After the user selects the speaker from an electronic device found through scanning, the mobile phone actively connects to the speaker, and establishes an SLB connection to the speaker. After the SLB connection is successfully established, the mobile phone may control the speaker to play the high-definition audio.

Currently, the process of establishing the SLB connection between the first device and the second device takes a long time, mainly because a process of interaction between the first device and the second device takes a long time. This is specifically described below.

Figure 11:
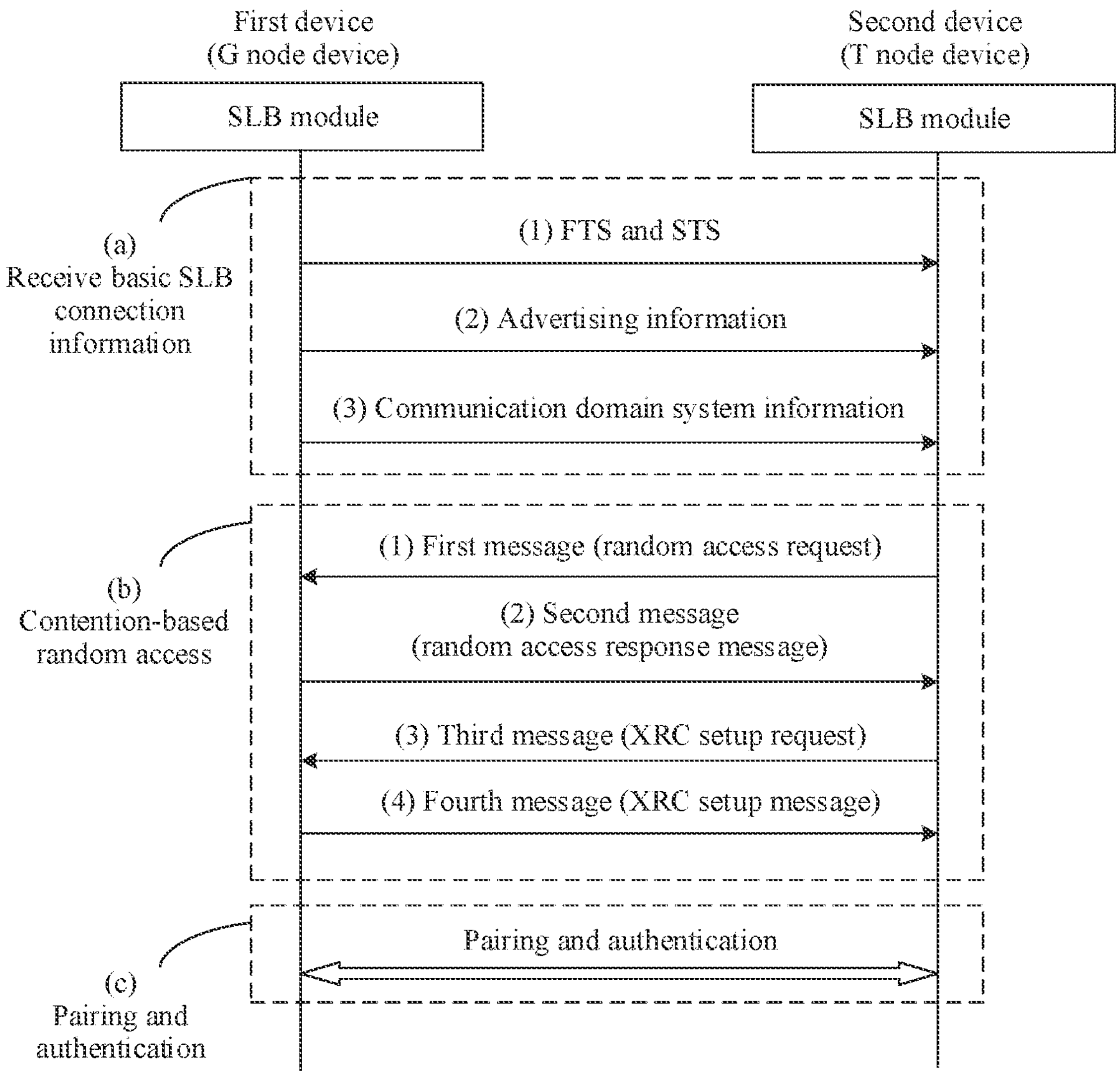
FIG. 11 is a diagram of content exchange between a first device and a second device in a process of establishing an SLB connection according to an embodiment of the present disclosure.

In this embodiment, in the process of establishing the SLB connection between the first device and the second device, a main interaction process includes content (a) to (c) shown in FIG. 11. For specific time taken by each content, refer to Table 2.

(a) The second device receives the SLB connection information: the FTS, the STS, the broadcast information, and the communication domain system information.

(b) The first device and the second device perform contention-based random access.

(c) The first device and the second device perform pairing and authentication.

TABLE 2

Time taken by a device interaction process

| Interaction process | Exchanged content | Duration | Total duration |
|---|---|---|---|
| (a) | The second device receives the FTS, the STS, and the broadcast information. | Approximately 10 ms | Approximately 140 ms |
| | The second device receives the communication domain system information. | Approximately 100 ms | |
| (b) | The first device and the second device perform contention-based random access and conflict resolution. | Approximately 20 ms | |
| (c) | The first device and the second device perform pairing and authentication. | Approximately 10 ms | |

With reference to Table 2, it can be learned that, in an ideal case, in the process of establishing the SLB connection between the first device (the G node device) and the second device (the T node device), the process of interaction between devices takes approximately 140 ms. It takes a long time (approximately 100 ms) to receive the communication domain system information.

Based on the foregoing descriptions, it can be learned that the process of interaction between the first device and the second device takes a long time mainly because the following processes (1) to (4) need to be performed.

(1) Detect the types of the FTS and the STS. In an ideal case, the SLB module of the second device (the T node device) performs correlation processing on a received signal and a local sequence whose root index is 1 or 40. If a height of a correlation peak exceeds a threshold, it is considered that an FTS is found and a type of the FTS is detected. Then a location of an STS may be deduced based on a location of the FTS, and a type of the STS is detected. Correlation processing needs to be performed for a maximum of two times to detect the type of the FTS, and correlation processing needs to be performed for a maximum of 20 times to detect the type of the STS. A detection process takes a long time.

In addition, if a height of a correlation peak exceeds a threshold during reception of an FTS but subsequent detection on a type of an STS fails (for example, a received FTS is interfering noise), FTS detection needs to be performed again. This takes a long time.

(2) Receive the broadcast information. The first device (the G node device) needs to use four super frames to send the broadcast information. Therefore, in a process of receiving the broadcast information, the T node device needs to perform blind detection on four to seven super frames to obtain a piece of complete broadcast information. For details, refer to the foregoing descriptions.

(3) Receive the communication domain system information.

First, the T node device needs to deduce, based on an indication of the broadcast information, the location of the common resource that carries the system control information, and performs blind detection on the system control information with a length of 60 bits at the location of the common resource. Then the T node device obtains, based on an indication of the system control information, the location of the time-frequency domain resource that carries the communication domain system information. Finally, the T node device receives the communication domain system information at the location of the time-frequency domain resource based on the broadcast cycle for the communication domain system information. A receiving process is complex and takes a long time.

In addition, a cycle of broadcast the communication domain system information by the G node device is 64, 128, 256, or 512 super frames, and the cycle information is carried in the communication domain system information. Therefore, when the T node device does not know a specific value of the broadcast cycle, the T node device needs to parse the communication domain system information once every 64 super frames. An operation is complex and takes a long time. For details, refer to the foregoing descriptions.

(4) A contention-based random access process. In an ideal case, the T node device can complete a synchronous connection to the G node device by initiating only one contention-based random access process. However, in a conflict scenario, the T node device may need to undergo a plurality of random access processes before being successfully connected.

To sum up, it can be learned that, in the process of establishing the SLB connection between the first device (the G node device) and the second device (the T node device), because the second device needs to perform blind detection on and receive the FTS, the STS, the broadcast information, and the communication domain system information that are advertised by the first device, and perform contention-based random access, identity authentication, conflict resolution, and the like, the process of establishing the SLB connection between the first device and the second device takes a long time, compromising user experience.

Therefore, embodiments of the present disclosure provide a method for establishing an SLB connection. The method relates to a process in which a first device and a second device establish an SLB connection with assistance of an SLE access technology. In the method, duration for establishing the SLB connection by the first device and the second device can be reduced, to improve efficiency of the SLB connection.

The following describes in detail the process, provided in embodiments of the present disclosure, in which the first device and the second device establish the SLB connection with assistance of the SLE access technology. It should be understood that, when a service requirement for establishing an SLB connection appears between the first device and the second device, an SLE connection between the first device and the second device may have been successfully established, or may not have been established. The following describes a process of establishing an SLB connection between the first device and the second device in each of the two scenarios.

(I) An SLE Connection has Been Established Between the First Device and the Second Device To reduce power consumption of a device, in a scenario without a high-bandwidth service requirement, only the SLE connection may be retained between the first device and the second device, and an SLB module is controlled to be in a sleep state. After an application on the first device delivers a high-bandwidth service requirement to the first device, the first device and the second device wake up their respective SLB modules, and transmit, through the SLE connection, related parameter information for establishing an SLB connection, to assist the first device and the second device in quickly establishing an SLB connection.

Figure 12:
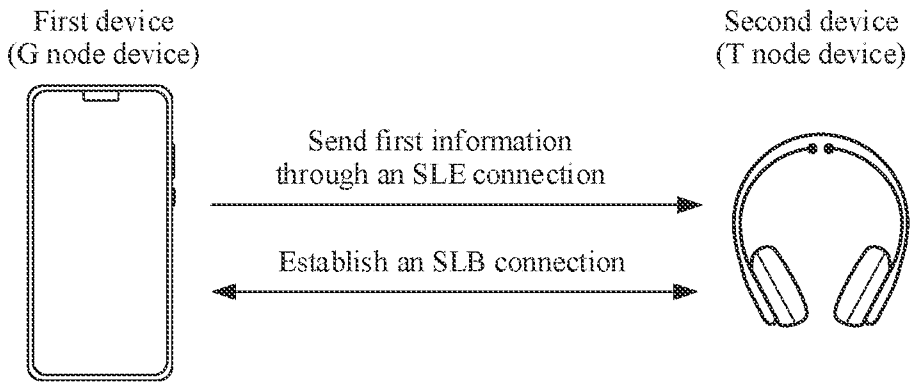
FIG. 12 is a diagram of an application scenario of establishing an SLB connection based on an SLE connection according to an embodiment of the present disclosure.

For example, as shown in FIG. 12, the first device is a mobile phone, and the second device is a wireless headset. When no high-definition audio is played, the mobile phone and the wireless headset retain only a connection between SLE modules. When the mobile phone needs to play the high-definition audio, the mobile phone and the wireless headset quickly establish an SLB connection with assistance of the existing SLE connection.

Figure 13A:
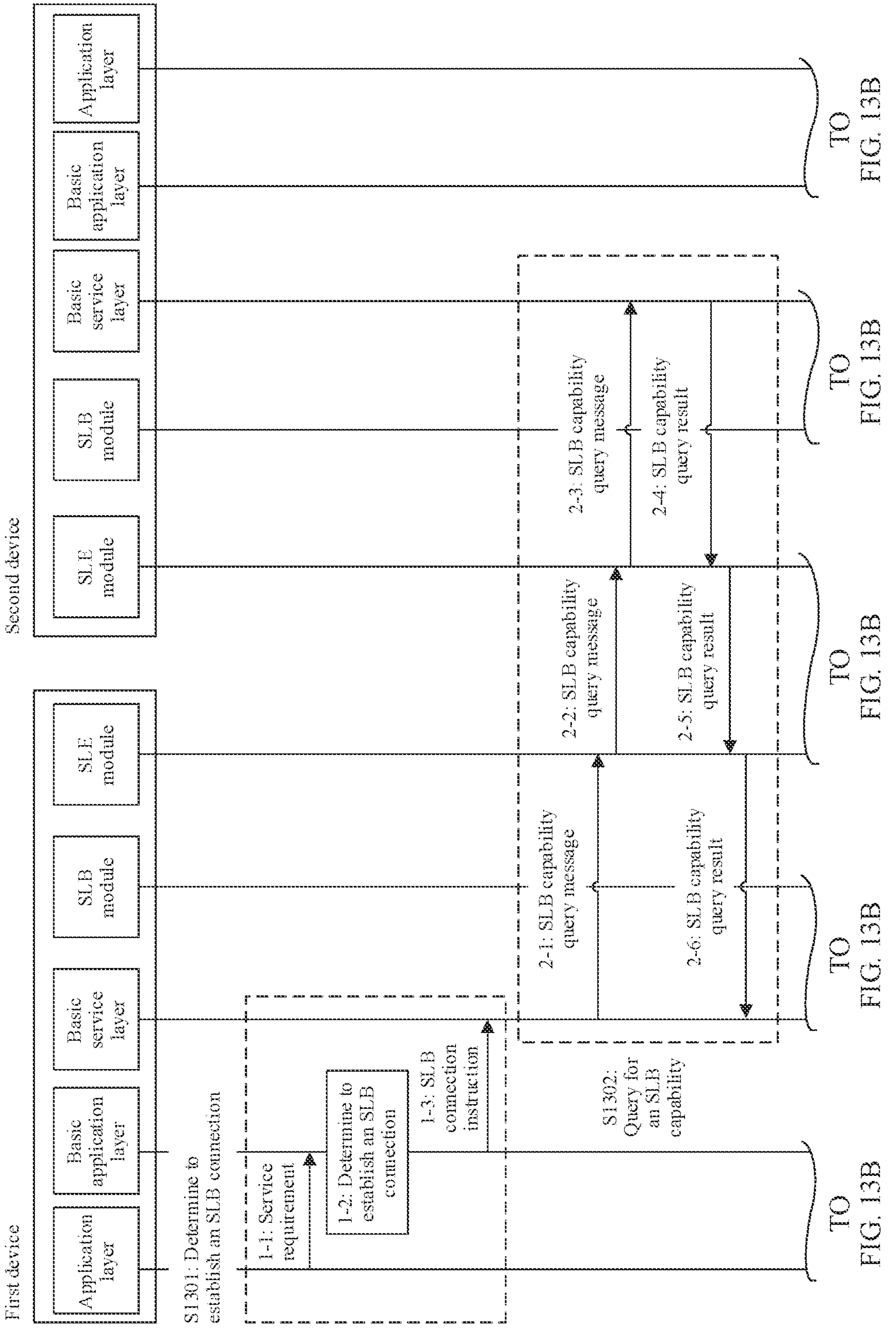
Figure 13C:
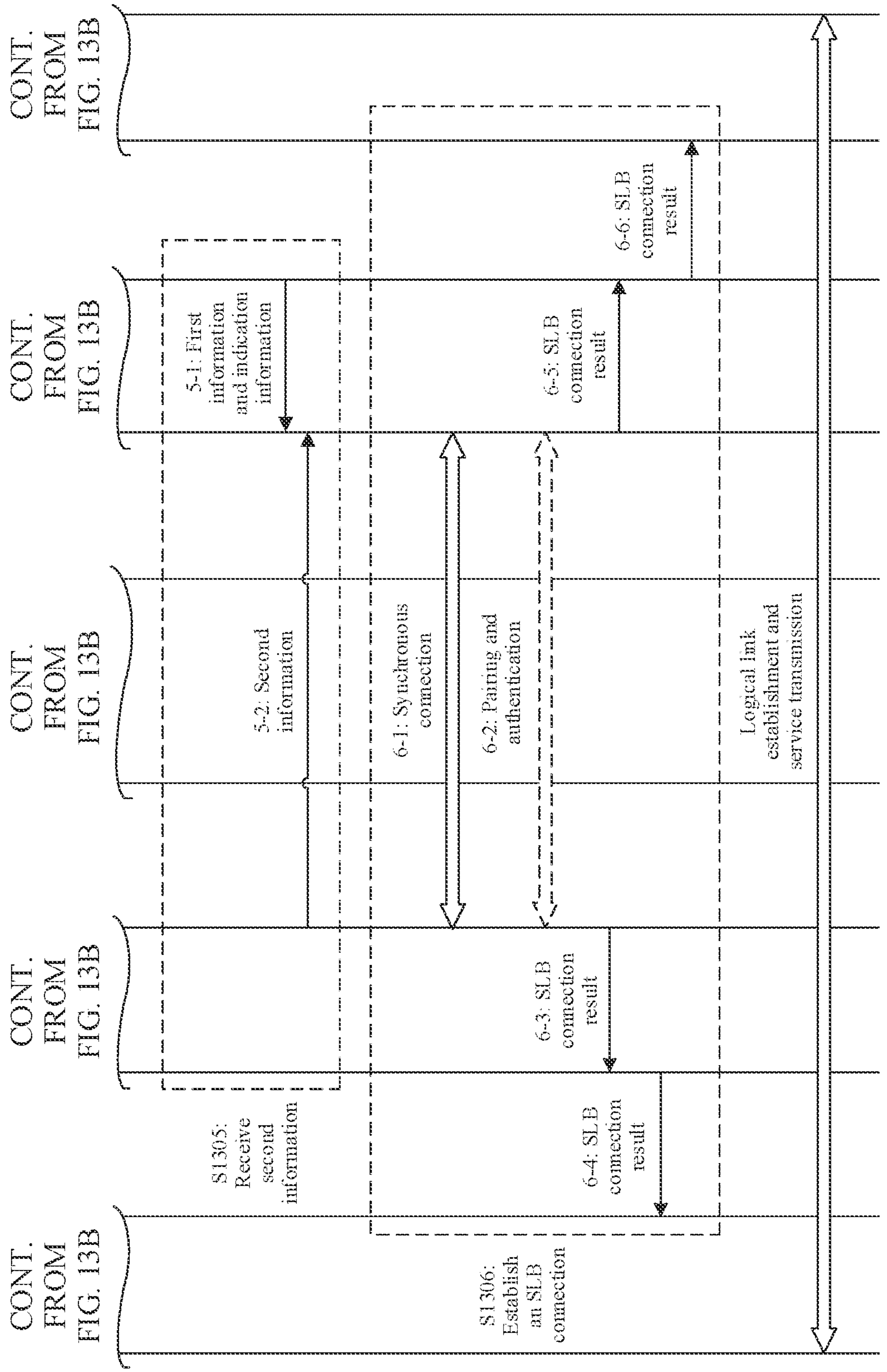

FIG. 13A, FIG. 13B, and FIG. 13C are a schematic flowchart of establishing an SLB connection between a first device and a second device according to another embodiment of the present disclosure, and relates to a process of establishing an SLB connection with assistance of an SLE connection when the SLE connection has been established between the first device and the second device. Specifically, the following steps S1301 to S1305 are included.

S1301: The first device determines to establish an SLB connection to the second device.

S1302: The first device queries for an SLB capability of the second device through the SLE connection.

S1303: When the second device has an SLB capability, the first device and the second device perform G/T role negotiation to determine a G node device and a T node device.

S1304: The G node device sends first information to the T node device. The first information includes at least one of auxiliary SLB connection information, and/or at least one of a first part (for example, broadcast information and communication domain system information) of SLB connection information.

S1305: The T node device receives second information. The second information includes a part, in the SLB connection information, that has not been previously sent to the second device through the SLE connection.

S1306: The T node device connects to the G node device based on the first information and the second information, to establish an SLB connection.

In the method for establishing an SLB connection in this embodiment of the present disclosure, the first device and the second device can quickly establish the SLB connection based on the SLE connection, and therefore user experience is good.

S1301 to S1306 are separately described in detail below.

S1301: The first device determines to establish an SLB connection to the second device. This step specifically includes the following content 1-1 to 1-3.

1-1: An application on the first device delivers a service requirement to a basic application layer of the first device.

Figure 14:
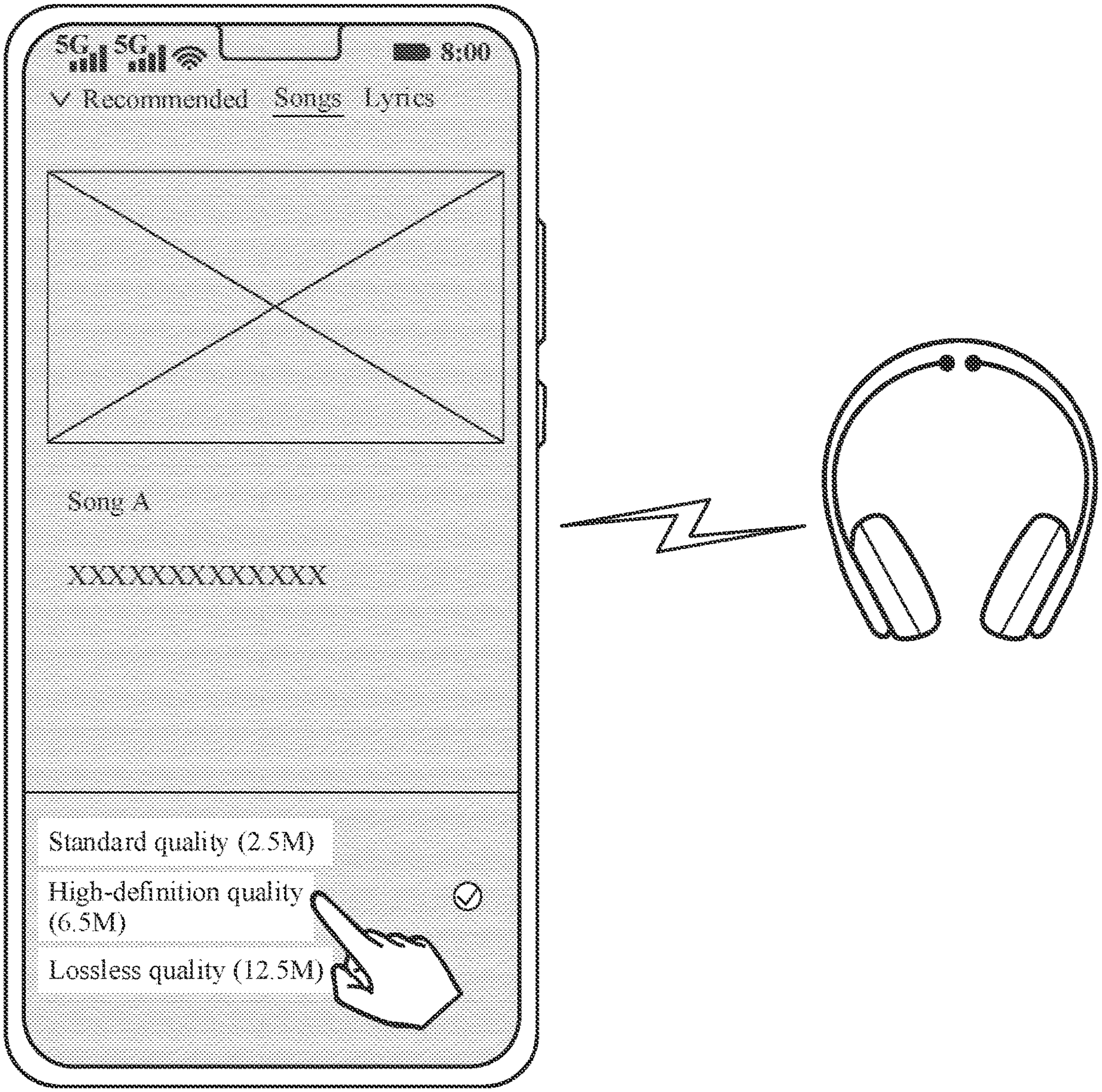
FIG. 14 is a first diagram of device control according to another embodiment of the present disclosure.

For example, when the first device is a mobile phone and the second device is a wireless headset, as shown in FIG. 14, after the mobile phone detects an operation of controlling, by a user, playing of high-definition audio, an audio play application on the mobile phone sends, to a basic application layer of the mobile phone, a service requirement corresponding to a high-definition audio play service.

1-2: When the service requirement exceeds a bearer capability of an SLE link, the basic application layer of the first device determines that an SLB connection needs to be established to the second device.

For example, a high-bandwidth service requirement includes a high-definition video play requirement, a high-definition audio play requirement, and the like, and has a high requirement for bandwidth during data transmission. Usually, an SLB connection can meet the high-bandwidth service requirement, and an SLE connection cannot meet the high-bandwidth service requirement. Therefore, when the service requirement exceeds the bearer capability of the SLE link, the first device determines to establish an SLB connection to the second device.

It should be noted that, in this embodiment, the high-definition audio is audio whose quality is higher than preset quality. For example, as shown in FIG. 14, the high-definition audio may be audio with high-definition quality or audio with lossless quality. A high-definition video is a video whose definition is higher than a preset definition. For example, the high-definition video may be a 480P, 720P, or 1080P video.

Figure 15:
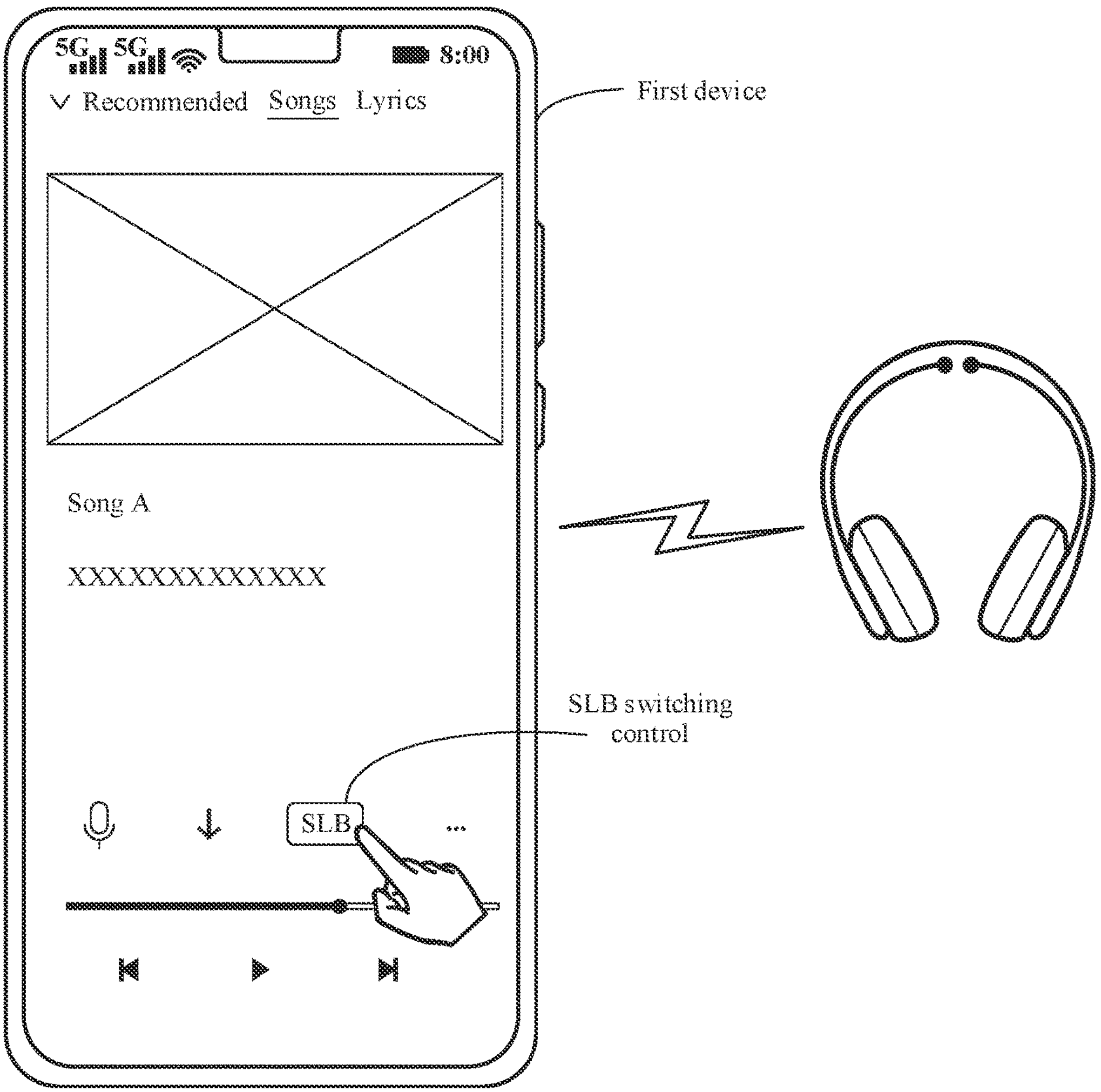
FIG. 15 is a second diagram of device control according to another embodiment of the present disclosure.

In another embodiment, a difference from 1-1 and 1-2 is as follows: When the first device is a mobile phone and the second device is a wireless headset, as shown in FIG. 15, in a process in which the first device controls, through the SLE connection, the wireless headset to play audio, the first device may alternatively determine, according to an instruction from a user, for example, based on an operation performed by the user on an SLB switching control, to establish an SLB connection to the second device, to play, through the SLB connection, audio that is currently played on the first device.

1-3: The basic application layer of the first device delivers an SLB connection instruction to a basic service layer of the first device.

In this embodiment, the SLB connection instruction is used to instruct the basic service layer of the first device to control establishment of an SLB connection between the first device and the second device, to transmit service data corresponding to the high-bandwidth service requirement.

S1302: The first device queries for an SLB capability of the second device through the SLE connection.

It should be noted that S1302 is an optional step. When the SLB capability of the second device is known to the basic service layer of the first device, after performing S1301, the first device may directly perform S1303 without performing S1302.

In this embodiment, the first device may learn the SLB capability of the second device in advance in the following stages. For example, in a device discovery stage before the first device establishes the SLE connection to the second device, the first device may obtain the SLB capability of the second device from broadcast sent by the second device. Alternatively, after the first device establishes the SLE connection to the second device, the first device may learn of the SLB capability of the second device during service discovery.

S1302 specifically includes the following content 2-1 to 2-6.

2-1: The basic service layer of the first device sends an SLB capability query message to an SLE module of the first device, where the SLB capability query message is used to query whether the second device has an SLB communication capability.

2-2: The SLE module of the first device sends an SLB capability query message to an SLE module of the second device based on the SLE connection.

2-3: The SLE module of the second device reports an SLB capability query message to a basic service layer of the second device.

2-4: The basic service layer of the second device sends an SLB capability query result to the SLE module of the second device in response to the SLB capability query message. The SLB capability query result indicates whether the second device has an SLB capability.

2-5: The SLE module of the second device sends an SLB capability query result to the SLE module of the first device based on the SLE connection.

2-6: The SLE module of the first device sends an SLB capability query result to the basic service layer of the first device.

S1303: When the second device has an SLB capability, the first device and the second device perform G/T role negotiation to determine a G node device and a T node device.

An SLB access technology defines a G role and a T role for SLB modules of both devices, where an electronic device with an SLB module of a G role is a G node device, and an electronic device with an SLB module of a T role is a T node device. Based on characteristics of the SLB access technology, only the T node device is allowed to connect to the G node device (to be specific, only the T node device is allowed to send a connection request to the G node device). Therefore, during establishment of an SLB connection between the first device and the second device, roles of the first device and the second device need to be first determined. This may also be understood as that, during establishment of an SLB connection between the first device and the second device, roles of the SLB module of the first device and the SLB module of the second device need to be first determined.

In this embodiment, because the first device triggers a connection service, the first device queries for a role of the second device, and initiates a process of role negotiation between the SLB module of the first device and the SLB module of the second device. That the SLB module of the first device and the SLB module of the second device perform G/T role negotiation may include the following three scenarios: (1) The SLB module of the first device is not woken up. (2) The SLB module of the first device has been woken up as a G role. (3) The SLB module of the first device has been woken up as a T role. The following describes a process of G/T role negotiation between the first device and the second device in each of the three scenarios.

Scenario (1): The SLB Module of the First Device is not Woken up

When the SLB module of the second device is not woken up, the basic service layer of the first device determines the following determining result: The SLB module of the first device is to play a G role after being woken up, and the SLB module of the second device is to play a T role after being woken up, in other words, the first device is a G node device, and the second device is a T node device; or the first device plays a T role after being woken up, and the second device plays a G role after being woken up, in other words, the first device is a T node device, and the second device is a G node device.

When the SLB module of the second device has been woken up as a T role, the basic service layer of the first device performs the following determining: The SLB module of the first device is to play a G role after being woken up, and the SLB module of the second device continues playing the T role, in other words, the first device is a G node device, and the second device is a T node device.

When the SLB module of the second device has been woken up as a G role, the basic service layer of the first device performs the following determining: The SLB module of the first device is to play a T role after being woken up, and the SLB module of the second device continues playing the G role, in other words, the first device is a T node device, and the second device is a G node device.

In the scenario (1), after determining a determining result, the basic service layer of the first device sends the determining result to the basic service layer of the second device based on the SLE connection. The first device and the second device maintain a role of a local SLB module based on the determining result.

Scenario (2): The SLB Module of the First Device has Been Woken up as a G Role When the SLB module of the second device is not woken up, the basic service layer of the first device performs the following determining: The SLB module of the first device continues playing the G role, and the SLB module of the second device is to be a T node after being woken up, in other words, the first device is a G node device, and the second device is a T node device.

When the SLB module of the second device has been woken up as a T role, the basic service layer of the first device performs the following determining: The SLB module of the first device continues playing the G role, and the SLB module of the second device continues playing the T role, in other words, the first device is a G node device, and the second device is a T node device.

In the foregoing two cases of the scenario (2), after determining a determining result, the basic service layer of the first device sends the determining result to the basic service layer of the second device based on the SLE connection. The first device and the second device maintain a role of a local SLB module based on the determining result.

When the SLB module of the second device has been woken up as a G role, because roles of both the SLB module of the first device and the SLB module of the second device are the G role, a role conflict occurs, and the basic service layer of the first device needs to determine whether the first device or the second device is to switch a role.

In some embodiments, the basic service layer of the first device determines that a local SLB module is to be restarted to switch a role of the local SLB module to a T role. If role switching for the SLB module of the first device succeeds, G/T role negotiation succeeds, and a negotiation result is as follows: The SLB module of the first device plays the T role, and the SLB module of the second device plays the G role, in other words, the first device is a T node device, and the second device is a G node device. If role switching for the SLB module of the first device fails (for example, the role cannot be switched due to a restart failure), role negotiation fails, the first device and the second device cannot establish an SLB connection due to a role conflict, and the basic service layer reports a connection failure result to the basic application layer.

In some other embodiments, the basic service layer of the first device determines that the second device is to restart the SLB module, and sends an SLB module restart request to the second device, where the request carries a role (namely, a T role) that the first device expects the second device to play after the restart. After receiving the SLB module restart request, the second device performs processing in the following two cases.

Case 1: The second device agrees to restart the SLB module, sends, to the first device, a notification indicating that the second device agrees to restart the SLB module, and after the SLB module is restarted, sends role information of the restarted SLB module to the first device.

Case 2: The second device does not agree to restart the SLB module, and sends, to the first device, a notification indicating that the second device does not agree to restart the SLB module. Role negotiation fails, establishment of an SLB connection fails, and the basic service layer reports a connection failure result to the basic application layer.

Scenario (3): The SLB Module of the First Device has Been Woken up as a T Role When the SLB module of the second device is not woken up, the basic service layer of the first device performs the following determining: The SLB module of the first device continues playing the T role, and the SLB module of the second device is to play a G role after being woken up, in other words, the first device is a T node device, and the second device is a G node device.

When the SLB module of the second device has been woken up as a G role, the basic service layer of the first device performs the following determining: The SLB module of the first device continues playing the T role, and the SLB module of the second device continues playing the G role, in other words, the first device is a T node device, and the second device is a G node device.

In the foregoing two cases of the scenario (3), after determining a determining result, the basic service layer of the first device sends the determining result to the basic service layer of the second device through the SLE connection. The first device and the second device maintain a role of a local SLB module based on the determining result.

When the SLB module of the second device has been woken up as a T role, because roles of both the SLB module of the first device and the SLB module of the second device are T nodes, a role conflict occurs, and the first device needs to determine whether the first device or the second device is to switch a role.

In some embodiments, the first device determines that a local SLB module is to be restarted to switch the SLB module to be a G role. If role switching for the SLB module of the first device succeeds, a G/T role negotiation result is as follows: The SLB module of the first device plays the G role, and the SLB module of the second device continues playing the T role, in other words, the first device is a G node device, and the second device is a T node device. If role switching for the SLB module of the first device fails, role negotiation fails, and establishment of an SLB connection fails.

In some other embodiments, the first device determines that the second device is to restart the SLB module, and sends an SLB module restart request to the second device, where the request carries a role (namely, a G role) that the first device expects the second device to play after the restart. After receiving the SLB module restart request, the second device performs processing in the following two cases.

Case 1: The second device agrees to restart the SLB module, sends, to the first device, a notification indicating that the second device agrees to restart the SLB module, and after the SLB module is restarted, sends role information of the restarted SLB module to the first device.

It should be noted that, if a role played by the SLB module of the second device after the restart is the G role (to be specific, a role that the first device expects the second device to become after the restart), role negotiation succeeds, and a G/T role negotiation result is as follows: The SLB module of the first device continues playing the T role, and the SLB module of the second device plays the G role, in other words, the first device is a T node device, and the second device is a G node device. If the restart of the SLB module of the second device fails, role negotiation fails, establishment of an SLB connection fails, and the basic service layer reports a connection failure result to the basic application layer.

Case 2: The second device does not agree to restart the SLB module, and sends, to the second a notification indicating that the second device does not agree to restart the SLB module. Establishment of an SLB connection fails, and the basic service layer reports a connection failure result to the basic application layer.

In S1303, for example, before the first device and the second device perform role negotiation, the SLB module of the first device has been woken up as a G role, and the SLB module of the second device has been woken up as a T role. A process of performing G/T role negotiation by the first device and the second device in S1303 includes the following steps 3-1 to 3-7.

3-1: The basic service layer of the first device sends a G/T role query message to the SLE module of the first device, where the G/T role query message is used to query for a working status and role information of the SLB module of the second device.

In this embodiment, the working status of the SLB module includes a sleep state and an awake state.

Optionally, the role query message further carries role information of the first device, and the role information indicates that the first device plays the G role. The second device may determine, based on the role information of the first device and role information of the second device, whether a role conflict occurs between the first device and the second device.

3-2: The SLE module of the first device sends a G/T role query message to the SLE module of the second device based on the SLE connection.

3-3: The SLE module of the second device reports a G/T role query message to the basic service layer of the second device.

3-4: The basic service layer of the second device sends a G/T role query result to the SLE module of the second device.

The G/T role query result includes the working status and a role of the SLB module of the second device. In this embodiment, the role query result is as follows: The SLB module of the second device has been woken up as the T role.

Optionally, when a role of the SLB module of the first device is the same as that of the SLB module of the second device, the role query result may further carry conflict indication information, and the conflict indication information indicates that a role conflict occurs between the SLB module of the first device and the SLB module of the second device. In addition, the role query result further includes restart indication information that indicates whether the SLB module of the second device supports a restart to switch a role.

3-5: The SLE module of the second device sends a G/T role query result to the SLE module of the first device based on the SLE connection.

3-6: The SLE module of the first device reports a G/T role query result to the basic service layer of the first device.

Because the SLB module of the first device has been woken up as the G role, after learning that the SLB module of the second device has been woken up as the T role, the basic service layer of the first device determines that a role of the SLB module of the first device remains as the G role.

3-7: The first device and the second device perform G/T role negotiation.

Because the SLB module of the first device has been woken up as the G role and the SLB module of the second device has been woken up as the T role, no role conflict occurs. In this case, the basic service layer of the first device obtains the following G/T role determining result: The SLB module of the first device plays the G role, and the SLB module of the second device plays the T role. The basic service layer of the first device sends the determining result to the second device. The SLB module of the first device remains as the G role based on the determining result, and the SLB module of the second device remains as the T role based on the determining result.

In the process of performing G/T role negotiation by the first device and the second device, when a role conflict occurs between the SLB module of the first device and the SLB module of the second device, if the SLB module of the second device does not support a restart to switch a role, the first device determines, based on a service status of the first device, whether to restart the SLB module. If a restart condition is met, the first device restarts the SLB module of the first device to switch a role. If the restart condition is not met, the SLB connection fails. If the SLB module of the second device supports a restart to switch a role, the first device determines, based on a service status of the first device, whether the SLB module of the first device can be restarted. If the first device meets a restart condition, the first device restarts the SLB module of the first device to switch a role. If the first device does not meet the restart condition, the second device needs to restart the SLB module to switch a role.

S1304: The G node device sends first information to the T node device.

For example, a G/T role negotiation result is as follows: The first device is a G node device, and the second device is a T node device. S1304 specifically includes the following content 4-1 to 4-9.

4-1: The basic service layer of the first device sends a first wake-up instruction to the SLB module of the first device, where the first wake-up instruction is used to wake up the SLB module and determine that a role of the SLB module is a G role.

4-2: In response to the first wake-up instruction, the SLB module of the first device is woken up as the G role.

It should be noted that 4-1 and 4-2 are optional steps. After the first device and the second device complete G/T role negotiation, if the SLB module of the first device is not woken up, the first device performs step 4-1 and step 4-2 to wake up the SLB module of the first device and determine that the SLB module plays the G role, so that the first device becomes the G node device. Alternatively, if the SLB module of the first device has been woken up as the G role, the first device does not need to perform step 4-1 or step 4-2.

4-3: The basic service layer of the second device sends a second wake-up instruction to the SLB module of the second device, where the second wake-up instruction is used to wake up the SLB module and determine that a role of the SLB module is a T role.

4-4: In response to the second wake-up instruction, the SLB module of the second device is woken up as the T role.

It should be noted that step 4-3 and step 4-4 are optional steps. After the first device and the second device complete role negotiation, if the SLB module of the second device is not woken up, the second device performs step 4-3 and step 4-4 to wake up the SLB module of the second device and determine that the SLB module plays the T role, so that the second device becomes the T node device. Alternatively, if the SLB module of the second device has been woken up as the T role, the second device does not need to perform step 4-3 or step 4-4.

4-5: The basic service layer of the first device sends a first information query message to the SLB module of the first device, where the first information query message is used to query first information of the first device.

4-6: The SLB module of the first device returns the first information to the basic service layer of the first device.

In this embodiment, information for establishing an SLB connection between the first device and the second device includes auxiliary SLB connection information and SLB connection information.

The auxiliary SLB connection information includes at least one of the following content (1) to (5).

(1) An broadcast frequency and bandwidth of the G node device.

(2) An FTS root index. The FTS root index indicates a root index of an FTS sent by the first device. The FTS root index is 1 or 40, and is used by an electronic device to generate or determine a local sequence signal in a process of receiving the FTS, and perform correlation processing on the local sequence signal and a received signal, to receive the FTS.

(3) An STS root index. The STS root index indicates a root index of an STS sent by the first device. The STS root index is an integer ranging from 1 to 20, and is used by an electronic device to generate or determine a local sequence signal in a process of receiving the STS, and perform correlation processing on the local sequence signal and a received signal, to receive the STS.

(4) A physical layer identifier: T-PhysID.

T-PhysID::=INTEGER (0 . . . 4095)

The physical layer identifier is used to uniquely identify the T node device in communication domain, and has a length of 12 bits. The physical layer identifier is used to select a non-contention-based random access resource. For details, refer to the foregoing descriptions. For non-contention-based random access, there is a mapping relationship between an access resource and a physical layer identifier, and the access layer resource may be known if the physical layer identifier is determined.

(5) An authentication credential: an authentication password and a 256-bit shared key (PSK).

The SLB connection information includes the following information (1) to (4).

(1) An FTS. For details, refer to the foregoing descriptions. Details are not described herein again in this embodiment.

(2) An STS. For details, refer to the foregoing descriptions. Details are not described herein again in this embodiment.

(3) Broadcast information. For specific content of the broadcast information, refer to the foregoing descriptions. Details are not described herein again in this embodiment.

(4) Communication domain system information. It should be noted that the communication domain system information may be simplified communication domain system information in a case in which an SLB connection is established with assistance of an SLE connection. For example, the simplified communication domain system information includes the following content a to g.

a. A domain name: DomainID::=BIT STRING (SIZE (48)). The domain name is a MAC address.

b. A carrier channel number: CarrierChannelConf::=SEQUENCE (SIZE (1 . . . 32)) OF ChannelNumber.

c. Information about a non-contention-based access resource pool:

```
NonContentionAccessResourceSYS ::= SEQUENCE {
        nonContentionAccessDuration        ENUMERATED    {ms512,
ms1024, ms2048, ms4096},
        nonContentionAccessResource     DedicatedOverheadTimeResource,
        nonContentionAccessModulation    SR-Modulation,    OPTIONAL,    --
Need ON
        nonContentionAccessSymNum     ENUMERATED {2,3,5,9}
        waiting Window                      INTEGER (0...1023),
        numY                                INTEGER (0...4095),
    }
    DedicatedOverheadTimeResource ::= BIT STRING (SIZE (96))
    SR-Modulation ::= ENUMERATED {qpsk, qam16, qam64, qam256, qam1024}
```

In the communication domain system information, the information element nonContentionAccessDuration indicates a cycle of the non-contention-based access resource pool, where ms512 represents 512 super frames, ms1024 represents 1024 super frames, ms2048 represents 2048 super frames, and ms4096 represents 4096 super frames.

The information element nonContentionAccessResource indicates a resource for sending non-contention access information in a super frame, and includes N symbols. In chronological order of symbols, nonContentionAccessSymNum overhead symbols constitute one group, and the N symbols are divided into a total of $$\frac{N}{nonContentionAccessSymNum}$$

groups. There are a total of $$\frac{nonContentionAccessDuration * N}{nonContentionAccessSymNum}$$

groups in a configuration cycle. Each group includes five non-contention-based access resources in ascending order of subcarrier numbers.

In the configuration cycle, there are a total of $$Y = \frac{nonContentionAccessDuration * N}{contentionAccessSymNum * 5}$$

non-contention-based access resources. In chronological order of all resource groups and in ascending order of subcarrier numbers in each group, the access resources are numbered #0 to #(Y−1).

The T node device selects a resource numbered mod(T-PhysID, Y) from these resources, and sends, on the resource, access information including the T-PhysID, where the T-PhysID is a physical layer identifier configured and stored by the G node device, or the T-PhysID is a physical layer identifier preconfigured by the T node device.

waitingWindow indicates a size of a waiting time window for random access, with a super frame as a unit.

d. A target receive power configuration for random access:

```
P0-NominalConfig::=SEQUENCE{rach-P0-Nominal-
    Config}
```

e. An acknowledgement ACK information resource for the T node device:

```
DedicatedACK-ResourceSetConf::=INTEGER (0 . . .
    31)
```

DedicatedACK-ResourceSetConf indicates a specific ACK resource pool in an ACK resource pool set. ACK indicates that, when the G node device schedules downlink data for the T node device, the T node device needs to return ACK information to the G node device on the specified ACK resource.

f. If the G node device has an access control function, the auxiliary SLB connection information further includes the following content:

| | | |
|---|---|---|
| accessControl | BIT STRING (SIZE (4)), | OPTIONAL, -- Need |

OR g. Information about a key negotiation algorithm:

| | |
|---|---|
| keyAlgNegotiation | BIT STRING (SIZE (32)) |

The broadcast information and the communication domain system information in the SLB connection information may be sent by the first device (namely, the G node device) to the second device through the SLE connection, and are referred to as a first part of the SLB connection information in this embodiment. However, because the FTS and the STS are synchronization signals during establishment of an SLB connection, the FTS and the STS can be sent by the first device to the second device only through SLB broadcast.

In this embodiment, the first information includes at least one of the auxiliary SLB connection information and/or the first part (namely, the broadcast information and the communication domain system information) of the SLB connection information. Therefore, with reference to the foregoing descriptions, it can be learned that the first information includes but is not limited to the following forms:

For example, the first information includes an broadcast frequency and bandwidth of the first device; or the first information includes the FTS root index; or the first information includes the FTS root index and the STS root index; or the first information includes the communication domain system information; or the first information includes the broadcast information and the communication domain system information; or the first information includes the FTS root index, the STS root index, the broadcast information, and the communication domain system information; or the first information includes a physical layer identifier of the first device, an authentication credential of the first device, and the broadcast information; or the first information includes an broadcast frequency and bandwidth of the first device, the FTS root index, the STS root index, a physical layer identifier of the first device, an authentication credential of the first device, the broadcast information, and the communication domain system information.

In addition, in some embodiments, when sending the broadcast information or the communication domain system information to the second device through the SLE connection, the first device may alternatively send only some content of the broadcast information or the communication domain system information. The communication domain system information is used as an example. The communication domain system information sent by the first device to the second device through the SLE connection may be the simplified communication domain system information shown above.

4-7: The basic service layer of the first device sends, to the SLE module of the first device, the first information and indication information for indicating the second device to initiate an SLB connection to the first device.

4-8: The SLB module of the first device sends the first information and the indication information to the SLE module of the second device based on the SLE connection.

4-9: The SLE module of the second device reports the first information and the indication information to the basic service layer.

It should be noted that, if the first device triggers an SLB connection service and is a T node device, the first device does not perform 4-5 to 4-9, but sends a request for obtaining first information to the second device, and the second device sends the first information to the first device based on the SLE connection.

Optionally, in 4-7 to 4-9, the first device may alternatively not send the indication information to the second device. After receiving the first information, the second device serves as a connection initiator by default to initiate a synchronous connection to the second device (to be specific, the first device and the second device are connected in a synchronous state in time-frequency domain).

S1305: The G node device sends second information to the T node device.

The second information includes a part, in the SLB connection information, that has not been previously sent to the second device through the SLE connection.

In some embodiments, if the SLB connection information in the first information includes only the broadcast information, the second information includes the FTS, the STS, and the communication domain system information.

In some other embodiments, if the SLB connection information in the first information includes only the communication domain system information, the second information includes the FTS, the STS, and the broadcast information.

In still some other embodiments, if the SLB connection information in the first information includes both the broadcast information and the communication domain system information, the second information includes the FTS and the STS.

In some other embodiments, if the first information does not include the SLB connection information, the second information includes the FTS, the STS, the broadcast information, and the communication domain system information.

After the first device sends the first information and the indication information to the second device (refer to step 5-1 in FIG. 13C), the SLB module of the first device starts to send SLB broadcast, where the SLB broadcast includes the second information (refer to step 5-2 in FIG. 13C). After receiving the indication information, the second device controls the SLB module of the second device to start to scan for the second information. Alternatively, after receiving the first information, the second device starts to serve as a connection initiator by default to start to control the SLB module of the second device to start to scan for the second information.

It should be noted that, if the first information includes the broadcast frequency and the bandwidth of the first device, in other words, the second device already knows, when receiving the second information, an broadcast frequency and bandwidth for sending the second information by the first device, the second device may receive the second information at the broadcast frequency and the bandwidth, to improve efficiency of receiving the second information.

When sending the second information, the first device first sends the FTS and the STS. After receiving the FTS and/or the STS, the SLB module of the second device implements downlink synchronization with the first device based on the FTS and/or the STS.

It should be noted that, if clock sources of an SLB module and an SLE module of the T node device are synchronized and frame boundaries of the SLB module and the SLE module are aligned, in a process in which the T node device performs synchronous connection to the G node device, the T node device needs to receive an STS sent by the G node device, to complete precise synchronization between the T node device and the G node device based on the STS. After the synchronization is completed, the T node device may initiate non-contention-based random access to the G node device. If the clock sources of the SLB module and the SLE module of the T node device are not synchronized, in a process in which the T node device performs synchronous connection to the G node device, the T node device needs to receive an FTS and an STS, and sequentially perform coarse synchronization and fine synchronization with the G node device based on the FTS and the STS.

In this embodiment, when the first information includes the FTS root index and/or the STS root index, the second device may quickly receive the FTS and/or the STS in the second information based on the first information.

This is because the first information includes the FTS root index and the STS root index. To be specific, root indexes of local signals that need to be generated for receiving the FTS and the STS are known to the T node device. Therefore, during synchronization, the T node device directly generates or determines local sequences by using the FTS root index and the STS root index respectively, and then receives the FTS and the STS based on the local sequences, so that clock synchronization efficiency of the T node device can be improved.

For example, when the FTS root index is known to the second device and the FTS root index is 1, the second device may determine that the first device has sent an FTS whose root index is 1. Therefore, the second device may locally obtain a prestored FTS sequence whose root index is 1 or locally generate an FTS sequence whose root index is 1, perform correlation processing on a received signal based on the sequence, and determine, from the received signal, the FTS whose root index is 1 and that is sent by the first device. The second device does not need to perform blind detection on the received signal by using an FTS sequence whose root index is 40 to receive the FTS, so that FTS receiving efficiency can be improved.

For another example, when the STS root index is known to the second device and the STS root index is 5, the second device may determine that the first device has sent an STS whose root index is 5. Therefore, the second device may locally obtain a prestored STS sequence whose root index is 5 or locally generate an STS sequence whose root index is 5, perform correlation processing on a received signal based on the sequence, and determine, from the received signal, the STS whose root index is 1 and that is sent by the first device. The second device does not need to perform blind detection on the received signal by using STS sequences whose root indexes are 1 to 4 and 6 to 20 to receive the STS, so that STS receiving efficiency can be improved.

After the synchronization is completed, in some embodiments, when the first information does not include any content of the broadcast information, after synchronizing with the second device, the first device further needs to send, to the second device, a part, in the broadcast information, that has not been sent to the second device. The second device needs to receive this part of broadcast information by using the SLB access technology, to ensure that the second device receives complete broadcast information before performing synchronous connection to the first device.

In some embodiments, when the first information does not include any content of the communication domain system information, the first device further needs to send, to the second device, a part, in the communication domain system information, that has not been sent to the second device. The second device needs to receive this part of communication domain system information by using the SLB access technology, to ensure that the second device receives complete communication domain system information before performing synchronous connection to the first device. After receiving the complete broadcast information and the complete communication domain system information, the second device may establish a connection to the first device based on the broadcast information and the communication domain system information.

S1306: The G node device and the T node device establish an SLB connection based on the first information and the second information.

Based on the SLB access technology, only a T node device can initiate a connection request to a G node device. In addition, in this embodiment, the first device is the G node device, and the second device is the T node device. Therefore, in S1306, the second device actively connects to the first device. Based on this, S1306 specifically includes the following content 6-1 to 6-6.

6-1: The SLB module of the second device performs synchronous connection to the SLB module of the first device based on the broadcast information and the communication domain system information in the first information and the second information.

Optionally, when the auxiliary SLB connection information includes non-contention-based resource information and the physical layer identifier of the first device, the second device initiates non-contention-based random access to the first device. In this embodiment, the non-contention-based random access process specifically includes the following two-way handshake process:

(1) The SLB module of the second device sends a first message (Msg1) to the SLB module of the first device, where content of the first message is mainly a random access request, and the random access request includes a physical layer identifier preconfigured or stored by the second device.

(2) The SLB module of the first device sends a fourth message (Msg4) to the SLB module of the second device, where the fourth message is an XRC setup (xrcsetup) message, and the setup message includes a physical layer identifier of the SLB module of the second device, and is used to respond to an access request of the T node device.

6-2: The SLB module of the first device and the SLB module of the second device perform pairing and authentication.

Optionally, because pairing and authentication are completed when the first device and the second device establish the SLE connection, the first device and the second device may alternatively not perform pairing or authentication when establishing the SLB connection with assistance of the SLE connection.

6-3: The SLB module of the first device sends an SLB connection result to the basic service layer of the first device.

6-4: The basic service layer of the first device sends an SLB connection result to the basic application layer of the first device.

6-5: The SLB module of the second device sends an SLB connection result to the basic service layer of the second device.

6-6: The basic service layer of the second device sends an SLB connection result to the basic application layer of the second device.

In S1301 to S1306, the SLB connection (specifically, an SLB physical link) between the first device and the second device is successfully established. The first device and the second device may establish a logical link or a service link based on the physical link, to transmit service data.

In the method for establishing an SLB connection in this embodiment of the present disclosure, the first device and the second device may transmit the auxiliary SLB connection information based on the SLE connection, to quickly establish the SLB connection based on the auxiliary SLB connection information; and/or may quickly transmit a part of the SLB connection information through the SLE connection, to avoid performing blind detection and receiving this part of the SLB connection information during the establishment of the SLB connection, and quickly establish the SLB connection. The SLB connection method provided in this embodiment takes short time and achieves good user experience.

Figure 16:
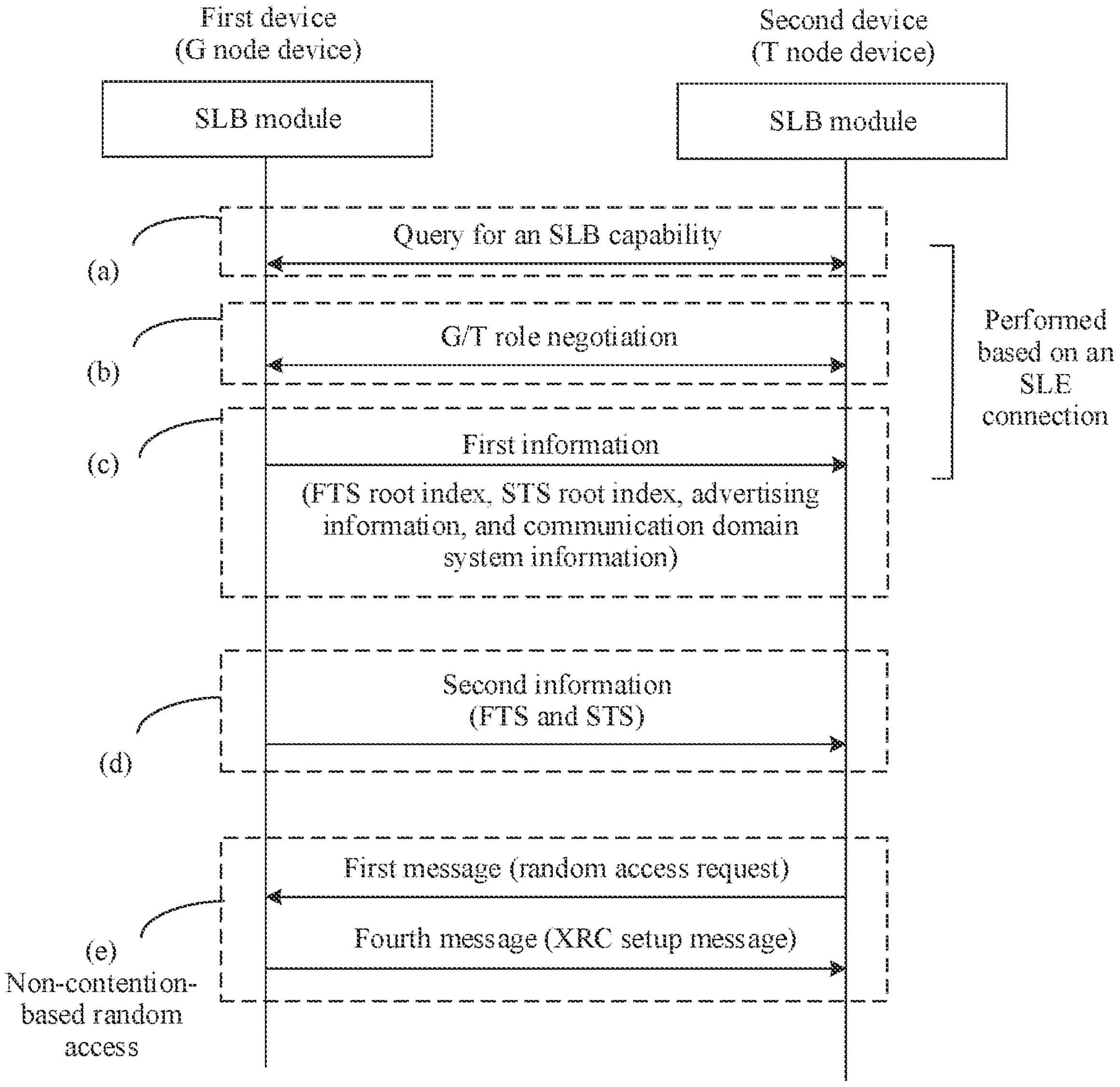
FIG. 16 is a diagram of content exchange between a first device and a second device in a process of establishing an SLB connection according to another embodiment of the present disclosure.

For example, the first information used during the establishment of the SLB connection includes the FTS root index, the STS root index, the broadcast information, and the communication domain system information, and the second information includes the FTS and the STS. With reference to FIG. 16, it can be learned that, in the process of establishing the SLB connection between the first device and the second device, a process of interaction between the first device and the second device mainly includes the following content (a) to (e). For interaction duration of each part of the content, refer to Table 3.

(a) The first device queries for an SLB capability of the second device.

(b) The first device performs role negotiation with the second device.

(c) The first device sends the first information, namely, the FTS root index, the STS root index, the broadcast information, and the communication domain system information, to the second device.

(d) The second device receives the second information, namely, the FTS and the STS, that is sent by the first device.

(e) The first device and the second device perform non-contention-based random access.

TABLE 3

Time taken by a device interaction process

| Interaction process | Exchanged content | Duration | Total duration |
|---|---|---|---|
| (a)<br>(b)<br>(c) | The first device queries for an SLB capability of the second device; performs role negotiation with the second device; and sends the FTS root index, the STS root index, the broadcast information, and the communication domain system information to the second device. | Approximately 10 ms | Approximately 22 ms |
| (d) | The second device receives the FTS and the STS. | Approximately 2 ms | |
| (e) | The first device and the second device perform non-contention-based random access. | Approximately 10 ms | |

As shown in Table 3, in the process of establishing the SLB connection in this embodiment, the process of interaction between the first device and the second device takes a short time, and takes only approximately 22 ms. Compared with time taken by a process of establishing an SLB connection without SLE assistance, time taken by the process of establishing the SLB connection with assistance of the SLE connection is reduced by approximately 120 ms. A main reason lies in that time taken by the synchronous connection process is significantly reduced.

In the process of establishing the SLB connection with assistance of the SLE connection, that the process of interaction between the first device and the second device takes a short time specifically includes the following factors (1) to (5).

(1) Time for detecting the types of the FTS and the STS is shortened. This is because the FTS root index and the STS root index are known to the second device when the second device receives the FTS and the STS, and the second device may directly determine a corresponding local sequence by using a corresponding root index, and then perform correlation processing on the received FTS and STS by using the local sequence, to determine the types of the FTS and the STS.

(2) The broadcast information does not need to be received during the synchronous connection. This is because the first device has previously sent the broadcast information to the second device based on the SLE connection. Therefore, during the synchronous connection, the second device does not need to receive or detect the broadcast information again.

(3) The communication domain system information does not need to be received during the synchronous connection. This is because the first device has previously sent the communication domain system information to the second device based on the SLE connection. Therefore, during the synchronous connection, the second device does not need to receive the communication domain system information again.

(4) Time taken by the random access process is shortened. This is because the first device has previously sent the physical layer identifier and a non-contention-based access resource parameter to the second device based on the SLE connection. Therefore, during the synchronous connection to the first device, the second device may connect to the second device in a non-contention-based random access mode.

(5) The first device and the second device may exchange an authentication password in an SLB two-way authentication credential through the SLE link, to reduce SLB authentication processes. Alternatively, if an authentication result for the SLE module is applicable to the SLB module, an SLB authentication process may not be performed.

To sum up, in the method for establishing an SLB connection in this embodiment, the first device and the second device may transmit, based on the SLE connection, the auxiliary SLB connection information (for example, the FTS root index, the STS root index, the physical layer identifier, and the non-contention-based access resource parameter) and a part of the SLB connection information (for example, the communication domain system information and the broadcast information) that are used for quickly establishing the SLB connection. This significantly reduces duration of interaction between the first device and the second device, to improve efficiency of establishing the SLB connection and improve user experience.

(II) No SLE Connection is Established Between the First Device and the Second Device In some embodiments, when no SLE connection is established between the first device and the second device and the first device has a high-bandwidth service requirement, the first device may first establish an SLE connection to the second device, and then quickly establish an SLB connection based on the method shown in S1301 to S1306. Details are not described herein again in this embodiment.

In some other embodiments, based on that an SLB module of the first device has been woken up as a G role and an SLB module of the second device has been woken up as a T role (in other words, the first device is a G node device, and the second device is a T node device), when no SLE connection is established between the first device and the second device, the first device may be discovered by the second device through SLE broadcast. When the second device has a high-bandwidth service requirement, the second device may perform synchronous connection to the first device, and establish an SLB connection to the first device. For details, refer to FIG. 17A and FIG. 17B.

Figure 17A:
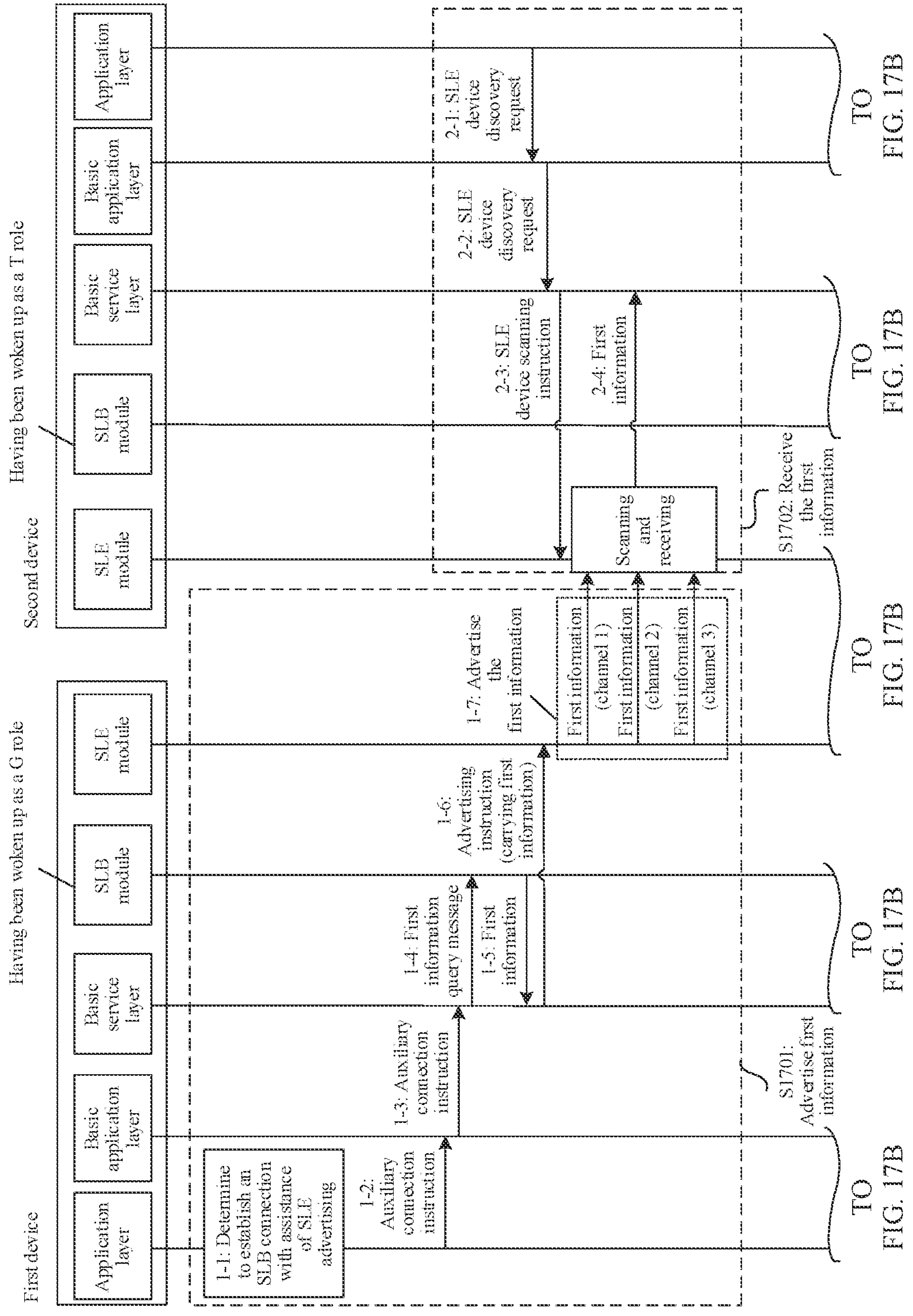
FIG. 17A and FIG. 17B are a flowchart of establishing an SLB connection between a first device and a second device according to still another embodiment of the present disclosure.
Figure 17B:
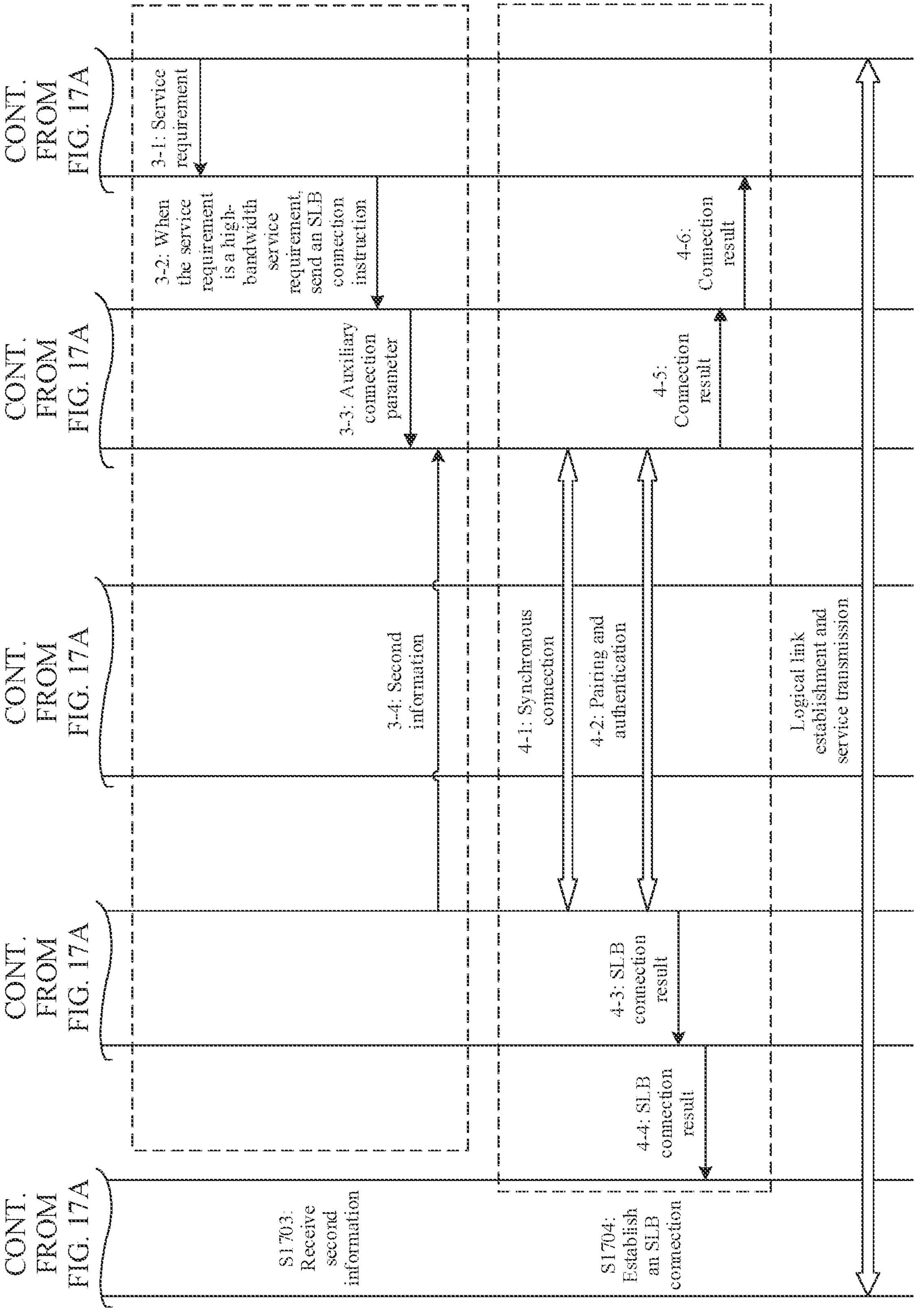

FIG. 17A and FIG. 17B are a schematic flowchart of establishing an SLB connection between a first device and a second device according to still another embodiment of the present disclosure. The method relates to a process of establishing an SLB connection with assistance of SLE broadcast when no SLE connection is established between the first device and the second device. The method includes the following steps S1701 to S1704.

S1701: The first device sends SLE broadcast, where the SLE broadcast carries first information of the first device.

In this embodiment, an SLB module of the first device plays a G role and is in an awake state, and an SLB module of the second device plays a T role and is in an awake state, in other words, the first device is a G node device, and the second device is a T node device. Because an SLE module has an advantage of low power consumption, an SLE module of the first device may periodically send SLE broadcast to the outside based on an upper-layer configuration (for example, after being started or according to a user instruction), and add the first information and other content to the SLE broadcast.

In this embodiment, the first information includes at least one of auxiliary SLB connection information and/or a first part (namely, broadcast information and communication domain system information) of SLB connection information.

The auxiliary SLB connection information includes at least one of the following content (1) to (3): (1) an broadcast frequency and bandwidth of the G node device; (2) an FTS root index; and (3) an STS root index. For specific content of each piece of auxiliary SLB connection information, refer to the foregoing descriptions. Details are not described herein again in this embodiment. It should be noted that, in this embodiment, because the auxiliary connection information is sent through SLE broadcast, from a perspective of ensuring information security for the first device and the like, the auxiliary SLB connection information does not include a device identifier or an authentication credential of the first device.

The SLB connection information includes an FTS, an STS, broadcast information, and basic communication domain system information, where the broadcast information and the basic communication domain system information are the first part of the SLB connection information.

In this embodiment, the communication domain system information may include the following content a to g.

a. A domain name (MAC address):

```
DomainID::=BIT STRING (SIZE (48))
```

b. A carrier channel number:

```
CarrierChannelConf::=SEQUENCE (SIZE (1 . . .
    32)) OF ChannelNumber
```

c. Parameters of a contention-based access resource pool:

```
        ContentionAccessResourceSYS ::= SEQUENCE
                contentionAccessResource
        DedicatedOverheadTimeResource,
                contentionAccessModulation              SR-Modulation,
                contentionAccessSymNum                  ENUMERATED
  (2,3,5,9},
                contentionPhysID-starting                   T-PhysID,
                contentionPhysID-ending                     T-PhysID,
                waitingWindow
        INTEGER (0...1023),
                backoffWindow
        INTEGER (0...1023)
          }
          SR-Modulation ::= ENUMERATED {qpsk, qam16, qam64, qam256, qam1024}
```

d. Target receive power for random access:

```
P0-NominalConfig::=SEQUENCE{rach-P0-Nominal-
    Config}
```

e. An ACK information resource for the T node device:

```
DedicatedACK-ResourceSetConf::=INTEGER (0 . . .
    31)
```

f. Access control:

```
        accessControl                 BIT STRING (SIZE (4)),          OPTIONAL,
    -- Need OR
```

g. Information about a key negotiation algorithm:

| | |
|---|---|
| keyAlgNegotiation | BIT STRING (SIZE (32)) |

With reference to the foregoing descriptions, the first information includes but is not limited to the following forms:

For example, the first information includes an broadcast frequency and bandwidth of the first device; or the first information includes the FTS root index; or the first information includes the FTS root index and the STS root index; or the first information includes the communication domain system information; or the first information includes the broadcast information and the communication domain system information; or the first information includes the FTS root index, the STS root index, the broadcast information, and the communication domain system information; or the first information includes an broadcast frequency and bandwidth of the first device, the FTS root index, the STS root index, the broadcast information, and the communication domain system information.

In addition, in some embodiments, when sending the broadcast information or the communication domain system information to the second device through SLE broadcast, the first device may alternatively send only some content of the broadcast information or the communication domain system information.

A specific process of broadcast the first information by the first device in S1701 includes the following content 1-1 to 1-7.

1-1: An application layer of the first device determines to establish an SLB connection with assistance of SLE broadcast.

In some embodiments, the application layer of the first device determines, based on a default configuration, to establish an SLB connection with assistance of SLE broadcast. For example, after an SLE function is enabled or after a specific application (for example, a video play application or an instant messaging application) is started, the first device determines to establish an SLB connection with assistance of SLE broadcast.

In some other embodiments, after receiving an operation performed by a user on an auxiliary connection control, the application layer determines to establish an SLB connection with assistance of SLE broadcast.

1-2: The application layer of the first device sends an auxiliary connection instruction to a basic application layer of the first device. The auxiliary connection instruction is used to instruct to use SLE broadcast to assist the first device in establishing an SLB connection to another device.

1-3: The basic application layer of the first device sends an auxiliary connection instruction to a basic service layer of the first device.

1-4: The basic service layer of the first device sends a first information query message to the SLB module of the first device, where the first information query message is used to query the first information of the first device.

1-5: The SLB module of the first device returns the first information to the basic service layer of the first device.

1-6: The basic service layer of the first device sends an broadcast instruction to the SLE module of the first device, where the broadcast instruction carries the first information, and is used to control the SLE module to send SLE broadcast that carries the first information.

1-7: The SLE module of the first device advertises the first information. In this embodiment, the SLE module of the first device simultaneously advertises the first information in three channels.

Figure 18:
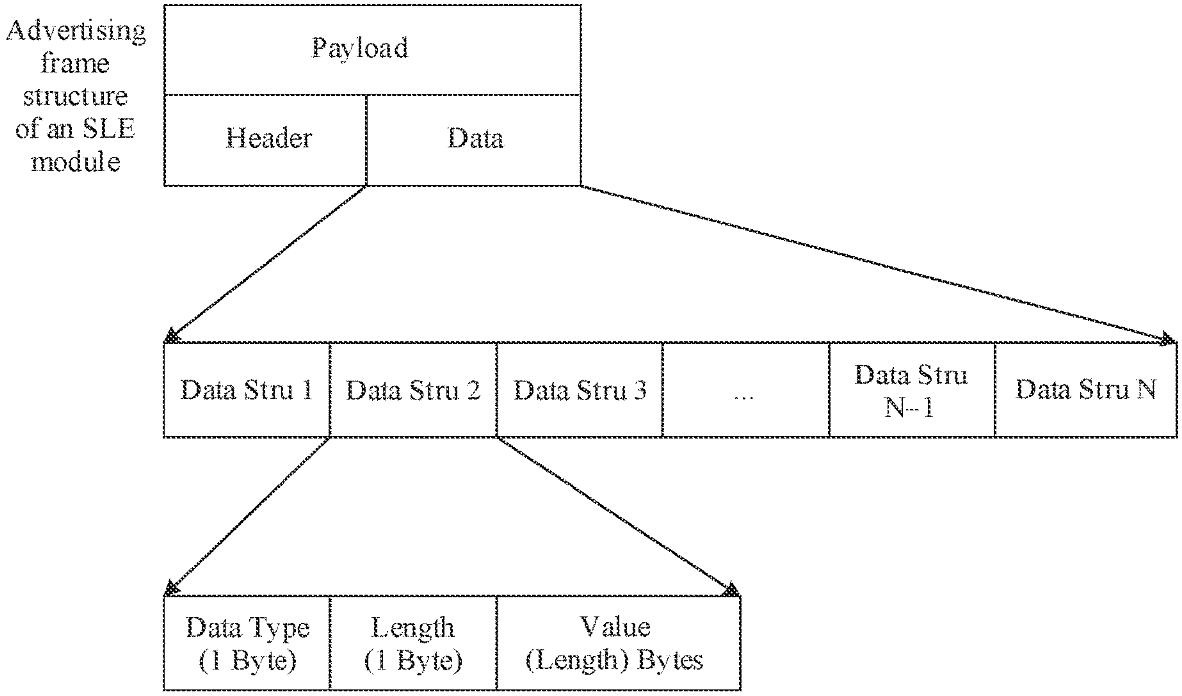
FIG. 18 is a diagram of a structure of SLE broadcast according to an embodiment of the present disclosure.

For example, as shown in FIG. 18, a payload (Payload) of SLE broadcast includes a header (Header) and a data part (Data). The data part includes N data structures (Data stru). Each data structure includes a data type (Data Type), data length information (Length), and data content (Value). The data type occupies one byte, the data length information occupies one byte (Bytes), and the data content occupies Length bytes. For example, when the data length (Length) is 0x64, the data content occupies 100 bytes.

When the SLE broadcast carries the first information, in a data structure carrying the first information, a data type indicates that data is the first information, and data content is the specific first information.

It should be noted that the SLE module of the first device (the G node device) may start to advertise the first information after being woken up, so that some basic connection information (for example, the broadcast information and the communication domain system information) for establishing an SLB connection, or some auxiliary connection information (for example, the FTS root index and the STS root index) for accelerating establishment of an SLB connection is advertised to a surrounding device with an SLE function before the first device has a high-bandwidth service requirement.

S1702: The second device scans the SLE broadcast to obtain the first information carried in the SLE broadcast.

When the second device (the T node device) does not have a high-bandwidth service requirement, to reduce power consumption, the second device may control the SLB module of the second device to sleep, and keep only the SLE module to periodically scan for and receive SLE broadcast. When the second device needs to process a high-bandwidth service, the T node device wakes up the SLB module of the T node device, and quickly establishes an SLB connection by using the first information in the previously received SLE broadcast. Alternatively, when the T node device needs to process a high-bandwidth service, the T node device first scans for and receives SLE broadcast to obtain the first information, and then performs SLB connection.

Figure 19:
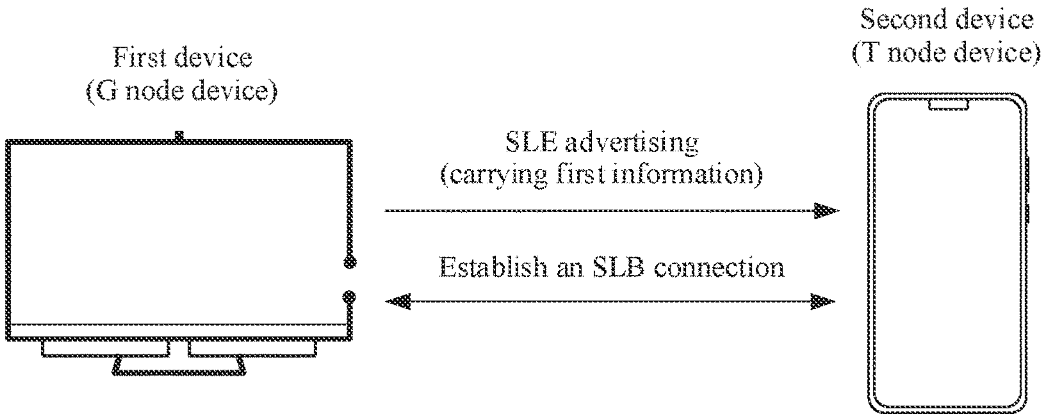
FIG. 19 is a diagram of an application scenario of establishing an SLB connection based on SLE broadcast according to an embodiment of the present disclosure.

For example, as shown in FIG. 19, the first device (the G node device) is a television, and the second device (the T node device) is a mobile phone. After being started, the television may send SLE broadcast to the outside, where the SLE broadcast carries the first information. When the mobile phone does not have a high-bandwidth service requirement, the mobile phone may control an SLB module of the mobile phone to sleep, and keep only SLE to periodically scan for and receive SLE broadcast. After the mobile phone detects an operation performed by a user on a screen projection control, the mobile phone may perform SLB connection by using the first information in the received SLE broadcast.

If the second device obtains the first information of the first device through SLE broadcast, the second device may determine that the first device has an SLB communication capability, in other words, the second device discovers a first device with an SLB communication function.

It should be noted that, when the first device advertises the first information to a surrounding T node device by using the SLE access technology, another G node device may also advertise first information of the G node device by using the SLE access technology. Therefore, the second device may receive first information sent by a plurality of G node devices, in other words, the second device may discover a plurality of electronic devices with an SLB communication function.

In this embodiment, a process of scanning for and receiving SLE broadcast by the second device (the T node device) specifically includes the following content 2-1 to 2-4.

2-1: An application layer of the second device sends an SLE device discovery request to a basic service layer.

For example, the first device is a television, and the second device is a mobile phone. The mobile phone may trigger, based on a default periodic scanning configuration or according to another application requirement for discovering an SLE device, an application to send an SLE device discovery request to a basic service layer.

2-2: A basic application layer of the second device sends an SLE device discovery request to the basic service layer of the second device.

2-3: The basic service layer of the second device sends a scanning instruction to the SLE module of the second device.

2-4: The SLE module of the second device sends, to the basic service layer of the second device, SLE broadcast that is found by scanning and that includes the first information.

S1703: When the second device has a high-bandwidth service requirement, the second device receives second information sent by the first device.

Figures 20A, 20B:
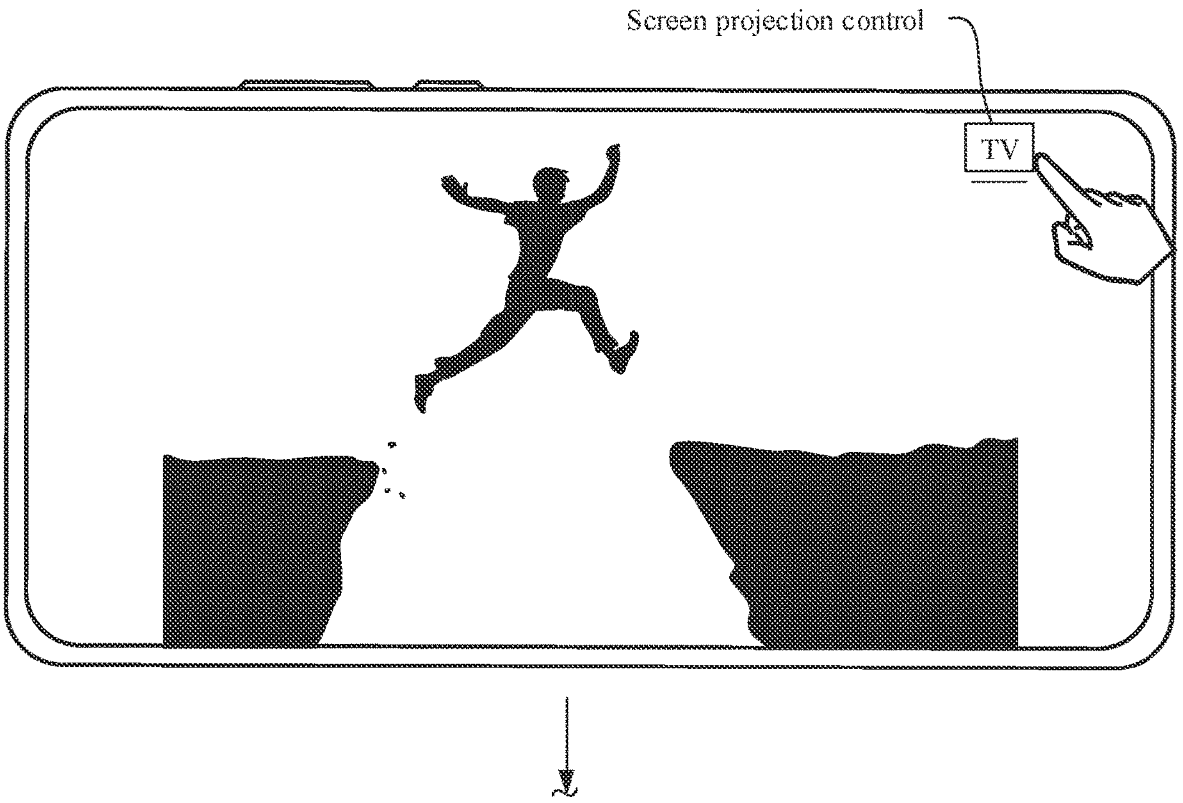
FIG. 20A and FIG. 20B are a diagram of device control according to still another embodiment of the present disclosure.
Figures 20A, 20B:
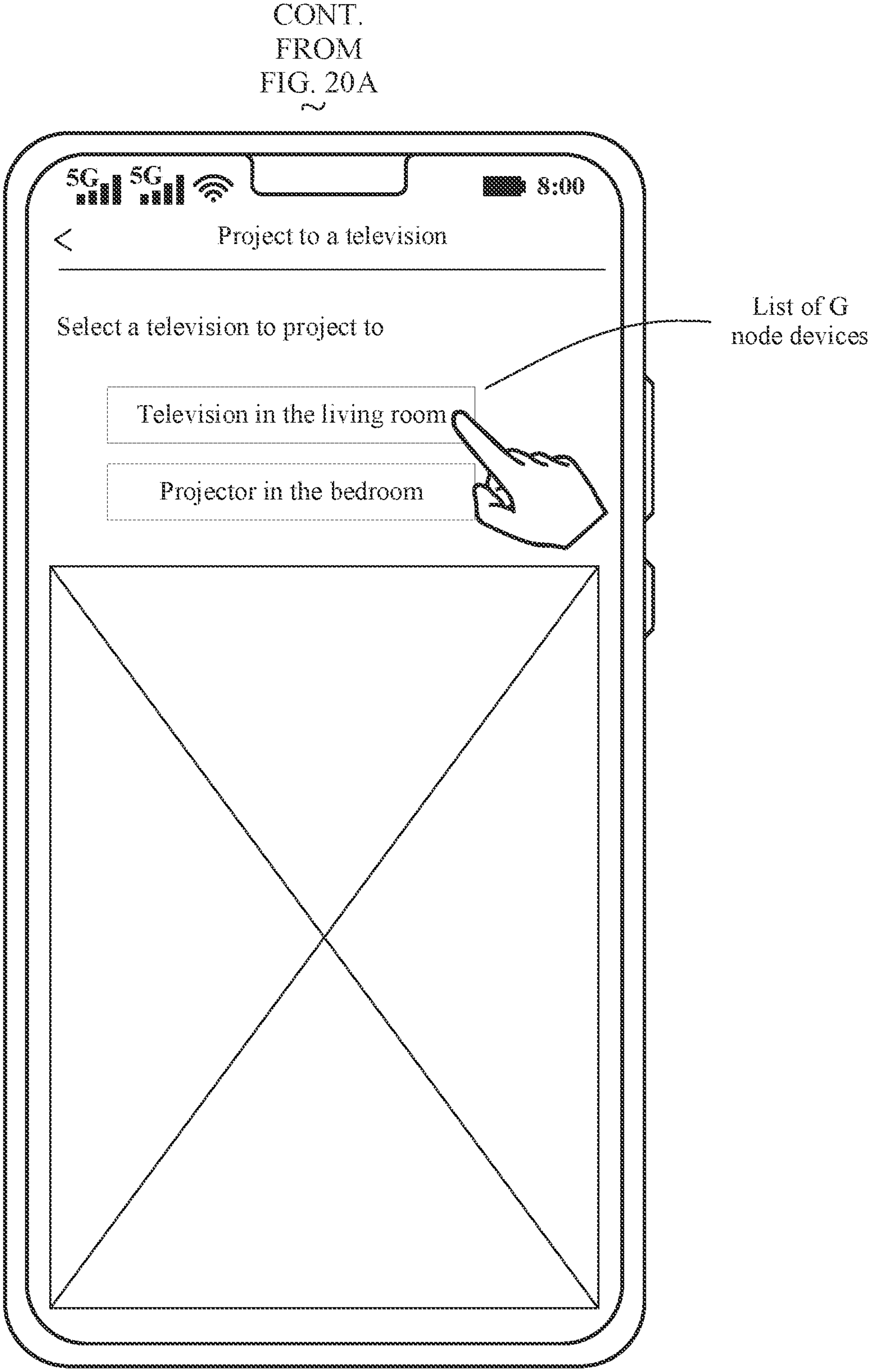

For example, as shown in FIG. 20A and FIG. 20B, in a process of playing a high-definition video by the second device by using a video play application, if the second device detects an operation performed by a user on a screen projection control on a video play interface, it indicates that the second device has a high-bandwidth service requirement of screen projection. Therefore, the second device displays a list of available G node devices based on previously received first information of G node devices. In response to an operation of selecting, by the user, the first device (for example, a television in a living room) from the list of G node devices, the second device starts to receive the second information sent by the first device.

Alternatively, if the first device is a screen projection device commonly used by the second device, after detecting the operation performed by the user on the screen projection control on the video play interface, the second device directly uses the first device as a default screen projection device, and receives the second information sent by the first device.

The second information includes a part, in the SLB connection information, that has not been previously sent to the second device through SLE broadcast.

In some embodiments, if the SLB connection information in the first information includes only the broadcast information, the second information includes the FTS, the STS, and the communication domain system information.

In some other embodiments, if the SLB connection information in the first information includes only the communication domain system information, the second information includes the FTS, the STS, and the broadcast information.

In still some other embodiments, if the SLB connection information in the first information includes both the broadcast information and the communication domain system information, the second information includes the FTS and the STS.

In some other embodiments, if the first information does not include the SLB connection information, the second information includes the FTS, the STS, the broadcast information, and the communication domain system information.

S1703 specifically includes the following content 3-1 to 3-4.

3-1: An application on the second device sends a service requirement to the basic application layer of the second device.

For example, the first device is a television, and the second device is a mobile phone. After detecting that a user chooses to connect to the television in a screen projection device search result, the mobile phone may send a service requirement to a basic application layer.

3-2: When the service requirement is a high-bandwidth service requirement, the basic application layer of the second device determines to establish an SLB connection to the first device, and sends an SLB connection instruction to the basic service layer of the second device.

3-3: The basic service layer of the second device sends, to the SLB module of the second device, the first information and indication information for indicating the second device to connect to the first device.

3-4: The second device receives the second information sent by the first device.

It should be noted that, if the first information includes the broadcast frequency and the bandwidth of the first device, in other words, the second device already knows, when receiving the second information, an broadcast frequency and bandwidth for sending the second information by the first device, the second device may receive the second information at the broadcast frequency and the bandwidth, to improve efficiency of receiving the second information.

When sending the second information, the first device first sends the FTS and the STS. The SLB module of the second device receives the FTS and/or the STS, and implements downlink synchronization with the first device based on the FTS and/or the STS. For details, refer to the foregoing descriptions. Details are not described herein again in this embodiment. After the downlink synchronization is completed, the second device may receive the broadcast information, and/or receive the communication domain system information based on the broadcast information, and/or subsequently establish a connection to the first device based on the communication domain system information.

In some embodiments, when the first information does not include any content of the broadcast information, after synchronizing with the second device, the first device further needs to send, to the second device, a part, in the broadcast information, that has not been sent to the second device. The second device needs to receive this part of broadcast information by using the SLB access technology, to ensure that the second device receives complete broadcast information before performing synchronous connection to the first device.

In some embodiments, when the first information does not include any content of the communication domain system information, the first device further needs to send, to the second device, a part, in the communication domain system information, that has not been sent to the second device. The second device needs to receive this part of communication domain system information by using the SLB access technology, to ensure that the second device receives complete communication domain system information before performing synchronous connection to the first device.

S1704: The second device and the first device establish an SLB connection based on the first information and the second information. Specifically, the following content 4-1 to 4-6 is included.

4-1: The SLB module of the second device performs synchronous connection to the SLB module of the first device based on the broadcast information and the communication domain system information in the first information and the second information.

It should be noted that, in this embodiment, the auxiliary SLB connection information does not include a physical layer identifier of the first device, in other words, the first device does not allocate the physical layer identifier of the first device to the second device, and the communication domain system information sent by the first device to the second device includes contention-based access resource information of the first device. Therefore, in a process of connecting to the first device, the second device cannot select a non-contention-based random access resource of the first device, and can perform only contention-based random access. For details about a contention-based random access process, refer to related descriptions in S404. Details are not described herein again in this embodiment.

4-2: The SLB module of the second device and the SLB module of the first device perform pairing and authentication.

4-3: The SLB module of the first device sends an SLB connection result to the basic service layer of the first device.

4-4: The basic service layer of the first device sends an SLB connection result to the basic application layer of the first device.

4-5: The SLB module of the second device sends an SLB connection result to the basic service layer of the second device.

4-6: The basic service layer of the second device sends an SLB connection result to the basic application layer of the second device.

In the foregoing steps S1701 to S1704, when no SLE connection is established between the first device and the second device, an SLB connection between the first device and the second device may be quickly established with assistance of SLE broadcast, and therefore user experience is good.

Figure 21:
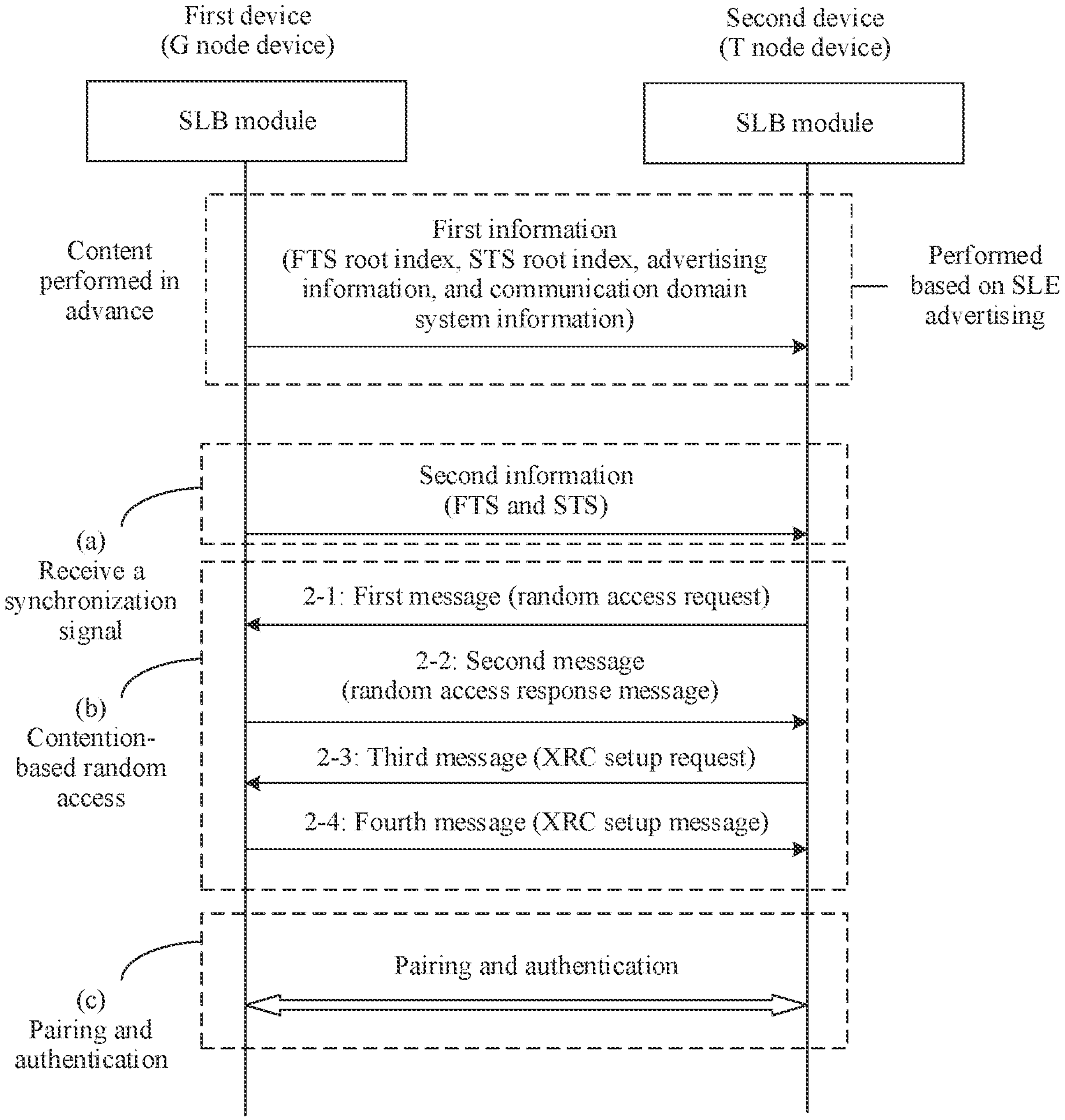
FIG. 21 is a diagram of content exchange between a first device and a second device in a process of establishing an SLB connection according to still another embodiment of the present disclosure.

For example, the first information used during the establishment of the SLB connection includes the FTS root index, the STS root index, the broadcast information, and the communication domain system information, and the second information includes the FTS and the STS. With reference to FIG. 21, it can be learned that, in the process of establishing the SLB connection between the first device and the second device, a process of interaction between the first device and the second device mainly includes the following content (a) to (c). For interaction duration of each part of the content, refer to Table 4.

(a) The first device advertises the first information, namely, the FTS root index, the STS root index, the broadcast information, and the communication domain system information, to the second device in advance.

(b) The second device receives the second information, namely, the FTS and the STS, that is sent by the first device.

(c) The first device and the second device perform contention-based random access.

TABLE 4

Time taken by a device interaction process

| Interaction process | Exchanged content | Duration | Total duration |
|---|---|---|---|
| (a) | The second device receives the first information. | A user is unaware of an operation performed in advance before the second device has a high-bandwidth service requirement, and the operation is not counted in device interaction duration. | Approximately 30 ms |
| (b) | The second device receives the second information. | Approximately 10 ms | |
| (c) | The second device and the first device perform contention-based random access. | Approximately 20 ms | |

As shown in Table 4, it can be learned that the process of establishing the SLB connection in this embodiment takes a short time, and takes only approximately 30 ms. Compared with time taken by a process of establishing an SLB connection without SLE assistance, time taken by the process of establishing the SLB connection with assistance of SLE broadcast is reduced by approximately 110 ms. A main reason lies in that time taken by the synchronous connection process is significantly reduced.

In the process of establishing the SLB connection with assistance of SLE broadcast, that the process of interaction between the first device and the second device takes a short time specifically includes the following factors (1) to (3).

(1) Time for detecting types of the FTS and the STS is shortened. This is because the FTS root index and the STS root index are known to the second device when the second device receives the FTS and the STS, and the second device may directly generate a corresponding local sequence by using a corresponding root index, and then perform correlation processing on the received FTS and STS by using the local sequence, to determine the types of the FTS and the STS.

(2) The broadcast information does not need to be received through blind detection during the synchronous connection. This is because the first device has previously obtained the broadcast information by scanning for and receiving the SLE broadcast. Therefore, during the synchronous connection, the second device does not need to detect the broadcast information again.

(3) The communication domain system information does not need to be received through blind detection during the synchronous connection. This is because the first device has previously obtained the communication domain system information by scanning for and receiving the SLE broadcast. Therefore, during the synchronous connection, the second device does not need to receive the communication domain system information again.

To sum up, when no SLE connection is established between the first device and the second device, the first device adds the auxiliary SLB connection information and/or a part of the SLB connection information to the SLE broadcast, so that the second device can pre-obtain the auxiliary SLB connection information from the broadcast during SLE scanning for subsequent use. When the second device subsequently needs to establish an SLB connection due to a service requirement, the second device may quickly establish an SLB connection to the first device by using the auxiliary SLB connection information and/or the part of the SLB connection information that have been obtained. In this method, time taken by the process of synchronous connection between the first device and the second device is significantly reduced, to improve efficiency of establishing the SLB connection and improve user experience.

The following describes an example process of performing pairing and authentication by a first device (a G node device) and a second device (a T node device) in embodiments of the present disclosure.

Figure 22:
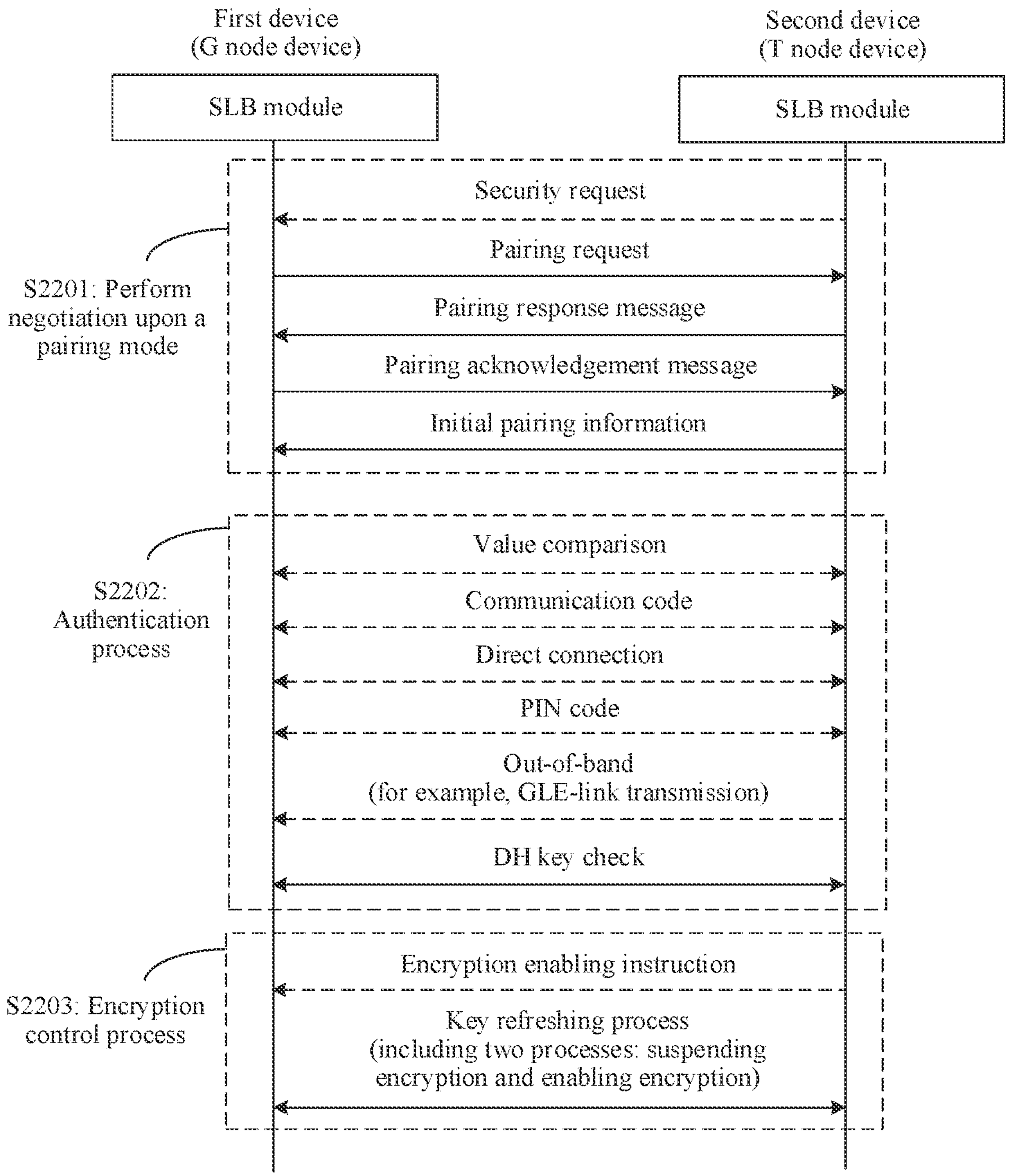
FIG. 22 is a flowchart of performing pairing and authentication by a first device and a second device according to an embodiment of the present disclosure.

FIG. 22 is a flowchart of performing pairing and authentication by a first device and a second device according to an embodiment of the present disclosure. The process specifically includes the following steps S2201 to S2203.

S2201: The first device and the second device perform negotiation upon a pairing mode.

A pairing mode for the first device (a G node device) and the second device (a T node device) includes: value comparison, communication code input, direct connection, PIN code input, an out-of-band (OOB) mode (for example, transmission based on an SLE connection), and the like. The first device and the second device determine a pairing mode through negotiation based on an input/output (I/O) capability. The I/O capability includes: whether there is keyboard input, whether there is screen output, and the like.

In this embodiment, a specific process of negotiation upon a pairing mode includes the following content:

An SLB module of the second device sends a security request to an SLB module of the first device, where the security request is used by the second device to actively initiate a pairing process. It should be noted that, when the first device actively initiates a pairing process, the second device may alternatively not send the security request to the first device.

The SLB module of the first device sends a pairing request to the SLB module of the second device, where the pairing request includes an I/O capability of the SLB module of the first device and other information, to initiate a pairing process to the first device.

The SLB module of the second device sends a pairing response message to the SLB module of the first device, where the pairing response message includes an I/O capability of the SLB module of the second device and other information.

The SLB module of the first device sends a pairing acknowledgement message to the SLB module of the second device, where the pairing acknowledgement message is used to exchange a public key, a random parameter, and the like with the second device.

The SLB module of the second device sends initial pairing information to the SLB module of the first device, where the initial pairing information includes a public key of the second device, a random parameter, and the like.

S2202: The first device and the second device perform mutual authentication.

The first device and the second device perform pairing in a pairing mode (for example, the PIN code input) determined through negotiation in S2201, to be specific, exchange identity check information, generate a check Diffie-Hellman (DH) key based on the identity check information, and check the DH key to complete mutual authentication.

In a process in which the first device and the second device establish an SLB connection with assistance of an SLE connection, the first device and the second device may transmit the identity check information based on the SLE connection.

S2203: The first device and the second device perform an encryption control process.

Optionally, after the SLB module of the second device sends an encryption enabling instruction to the SLB module of the first device, the first device and the second device encrypt to-be-transmitted data or an SLB link by using the DH key. Alternatively, after the DH key is checked between the first device and the second device, the to-be-transmitted data or the SLB link is directly encrypted by using the DH key.

The SLB module of the first device and the SLB module of the second device may refresh a key during communication. A key refreshing process includes two processes: suspending encryption and enabling encryption. To be specific, encryption needs to be first suspended, and then a key is updated, and then encryption is enabled by using a new key.

It should be understood that sequence numbers of the steps in the foregoing embodiments do not mean execution sequences. Execution sequences of processes should be determined based on functions and internal logic of the processes and should not be construed as any limitation on implementation processes of embodiments of the present disclosure.

Based on the method for establishing an SLB connection in the foregoing embodiments, embodiments of the present disclosure further provide the following technical solutions.

An embodiment of the present disclosure provides an apparatus for establishing an SLB connection. The apparatus is used in a first device, and the apparatus includes: a first SLE module configured to send first information to a second device by using an SLE access technology; and a first SLB module configured to send second information to the second device by using an SLB access technology, and establish an SLB connection to the second device according to a request of the second device, where the request is sent by the second device based on the first information and the second information.

The first device is a grant node device, and the second device is a terminal node device. Both the first device and the second device support communication by using the SLB access technology and the SLE access technology.

Optionally, that the first SLE module is configured to send first information to a second device by using an SLE access technology includes the first SLE module is configured to: when an SLE connection has been established between the first device and the second device, send, the first information to the second device through the SLE connection; or when no SLE connection is established between the first device and the second device, send, the first information to the second device through SLE broadcast.

Optionally, the first information includes at least one of the following content: an broadcast frequency and bandwidth of the first device; a root index of a synchronization signal of the first device; a physical layer identifier of the first device; an authentication credential of the first device; all or some content of broadcast information of the first device; and all or some content of communication domain system information of the first device. When the first information is sent through SLE broadcast, the first information does not include the physical layer identifier or the authentication credential.

Optionally, the second information includes: a synchronization signal; a part, not included in the first information, of the broadcast information; and a part, not included in the first information, of the communication domain system information.

Another embodiment of the present disclosure further provides an apparatus for establishing an SLB connection. The apparatus is used in a second device, and the apparatus includes: a second SLE module configured to receive, by using an SLE access technology, first information sent by a first device; and a second SLB module configured to receive, by using an SLB access technology, second information sent by the first device, and establish an SLB connection to the first device based on the first information and the second information by using the SLB access technology.

The first device is a grant node device, and the second device is a terminal node device. Both the first device and the second device support communication by using the SLB access technology and the SLE access technology.

Optionally, that the second SLE module is configured to receive, by using an SLE access technology, first information sent by a first device includes: When an SLE connection has been established between the first device and the second device, the second device receives, through the SLE connection, the first information sent by the first device; or when no SLE connection is established between the first device and the second device, the second device receives, through SLE broadcast, the first information sent by the first device.

Optionally, the first information includes at least one of the following content: an broadcast frequency and bandwidth of the first device; a root index of a synchronization signal of the first device; a physical layer identifier of the first device; an authentication credential of the first device; all or some content of broadcast information of the first device; and all or some content of communication domain system information of the first device. When the first information is received through SLE broadcast, the first information does not include the physical layer identifier or the authentication credential.

Optionally, the second information includes: a synchronization signal; a part, not included in the first information, of the broadcast information; and a part, not included in the first information, of the communication domain system information.

Optionally, when the first information includes the broadcast frequency and the bandwidth, that the second SLB module is configured to establish an SLB connection to the first device based on the first information and the second information by using the SLB access technology includes:

The second SLB module is configured to: receive the synchronization signal based on the broadcast frequency and the bandwidth; synchronize with the first device based on the synchronization signal; receive, based on the broadcast frequency and the bandwidth, a part, not included in the first information, of the second information, and the part, not included in the first information, of the communication domain system information; and establish the SLB connection to the first device based on the broadcast information and the communication domain system information by using the SLB access technology.

Optionally, when the first information includes the root index of the synchronization signal, that the second SLB module is configured to establish an SLB connection to the first device based on the first information and the second information by using the SLB access technology includes:

The second SLB module is configured to: receive the synchronization signal based on the root index of the synchronization signal; synchronize with the first device based on the synchronization signal; receive the part, not included in the first information, of the broadcast information, and the part, not included in the first information, of the communication domain system information; and establish the SLB connection to the first device based on the broadcast information and the communication domain system information by using the SLB access technology.

Optionally, when the synchronization signal includes an FTS and an STS and the root index of the synchronization signal includes an FTS root index and an STS root index, that the second SLB module is configured to receive the synchronization signal based on the root index of the synchronization signal includes the second SLB module is configured to receive the FTS based on the FTS root index, and receive the STS based on the STS root index.

Optionally, when the first information includes the physical layer identifier of the first device, that the second SLB module is configured to establish an SLB connection to the first device based on the first information and the second information by using the SLB access technology includes the second device receives the synchronization signal. The second device synchronizes with the first device based on the synchronization signal. The second device receives the part, not included in the first information, of the broadcast information, and the part, not included in the first information, of the communication domain system information. The second device establishes the SLB connection to the first device in a non-contention-based random access mode based on the physical layer identifier, the broadcast information, and the communication domain system information.

Optionally, when the first information includes the authentication credential, that the second SLB module is configured to establish an SLB connection to the first device based on the first information and the second information by using the SLB access technology includes:

The second SLB module is configured to: receive the synchronization signal; synchronize with the first device based on the synchronization signal; receive the part, not included in the first information, of the broadcast information, and the part, not included in the first information, of the communication domain system information; and establish the SLB connection to the first device based on the authentication credential, the broadcast information, and the communication domain system information by using the SLB access technology.

An embodiment provides an electronic device. The electronic device includes the sparklink short-range wireless communication protocol architecture shown in the foregoing embodiments, and is configured to perform the method for establishing an SLB connection that is performed by the first device or the second device in the foregoing embodiments.

Figure 23:
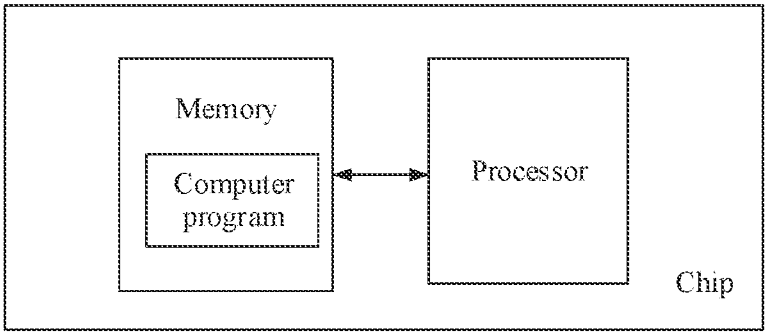
FIG. 23 is a diagram of a structure of an electronic device according to an embodiment of the present disclosure.

An embodiment provides a chip. As shown in FIG. 23, the chip includes a processor and a memory. The memory stores a computer program. When the computer program is executed by the processor, the method for establishing an SLB connection with assistance of an SLE technology that is performed by the first device or the second device in the foregoing embodiments is implemented.

An embodiment provides a computer-readable storage medium. The computer-readable storage medium stores a computer program. When the computer program is executed by a processor, the method for establishing an SLB connection with assistance of an SLE technology that is performed by the first device or the second device in the foregoing embodiments is implemented.

An embodiment provides a computer program product. The program product includes a computer program. When the computer program is run by an electronic device, the electronic device is enabled to implement the method for establishing an SLB connection with assistance of an SLE technology that is performed by the first device or the second device in the foregoing embodiments.

It should be understood that the processor mentioned in embodiments of the present disclosure may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of the present disclosure may be a volatile memory or a non-volatile memory, or may include both a volatile memory and a non-volatile memory. The non-volatile memory may be a read-only memory (ROM), a programmable ROM (PROM), an erasable programmable ROM (EPROM), an electrically erasable programmable ROM (EEPROM), or a flash memory. The volatile memory may be a random-access memory (RAM) and serves as an external cache. By way of example but not limitative description, RAMs in many forms may be used, for example, a static RAM (SRAM), a dynamic RAM (DRAM), a synchronous dynamic RAM (SDRAM), a double data rate synchronous dynamic RAM (DDR SDRAM), an enhanced synchronous dynamic RAM (ESDRAM), a SynchLink dynamic RAM (SLDRAM), and a direct Rambus RAM (DR RAM).

In embodiments provided in the present disclosure, division into the frameworks or modules is merely logical function division and may be other division in actual implementation. For example, a plurality of frameworks or modules may be combined or integrated into another system, or some features may be ignored or not performed.

In addition, functional modules in embodiments of the present disclosure may be integrated into one processing module, each of the modules may exist alone physically, or two or more modules may be integrated into one module. The integrated module may be implemented in a form of hardware, or may be implemented in a form of a software functional module.

Persons skilled in the art can clearly understand that, for ease and brevity of description, for a detailed operating process of the foregoing system, apparatus, and unit, reference may be made to a corresponding process in the foregoing method embodiments, and details are not described herein again.

Reference to "an embodiment", "some embodiments", or the like described in the specification of the present disclosure indicates that one or more embodiments of the present disclosure include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

The foregoing embodiments are merely intended to describe the technical solutions of the present disclosure, but are not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present disclosure, and these modifications and replacements shall fall within the protection scope of the present disclosure.

What is claimed is:

1. A method, implemented by a first device, the method comprising:
- sending first information to a second device by using a sparklink-low energy (SLE) access technology;
- sending second information to the second device by using a sparklink-basic (SLB) access technology;
- receiving a request from the second device to establish an SLB connection to the second device, wherein the request is based on the first information and the second information; and
- establishing the SLB connection to the second device according to the request.

2. The method of claim 1, wherein sending the first information to the second device by using the SLE access technology comprises:
- establishing an SLE connection between the first device and the second device; and
- sending the first information to the second device through the SLE connection.

3. The method of claim 1, wherein sending the first information to the second device by using the SLE access technology comprises:
- determining that no SLE connection is established between the first device and the second device; and
- sending the first information to the second device through SLE broadcast in response to determining that that no SLE connection is established between the first device and the second device.

4. The method of claim 1, wherein the first information comprises at least one of the following:
- a broadcast frequency and a bandwidth of the first device;
- a root index of a synchronization signal of the first device;
- a physical layer identifier of the first device;
- an authentication credential of the first device; or
- all or some content of broadcast information of the first device; or all or some content of communication domain system information of the first device.

5. The method of claim 4, wherein the second information comprises:
- the synchronization signal;
- a first part of the broadcast information; and
- a second part of the communication domain system information, wherein the first information does not comprise the first part or the second part.

6. The method of claim 4, further comprising further sending the first information through SLE broadcast, wherein the first information does not comprise the physical layer identifier or the authentication credential.

7. An electronic device comprising:
- a memory configured to store instructions; and
- a processor coupled to the memory and configured to execute the instructions to cause the electronic device to:
  - send first information to a second device by using a sparklink-low energy (SLE) access technology;
  - send second information to the second device by using a sparklink-basic (SLB) access technology;
  - receive a request from the second device to establish an SLB connection to the second device, wherein the request is based on the first information and the second information; and
  - establish the SLB connection to the second device according to a the request of the second device.

8. The electronic device of claim 7, wherein the processor is further configured to execute the instructions to cause the electronic device to:
- establish an SLE connection between the electronic device and the second device; and
- send the first information to the second device through the SLE connection.

9. The electronic device of claim 7, wherein the processor is further configured to execute the instructions to cause the electronic device to:
- determine that no SLE connection is established between the electronic device and the second device; and
- send the first information to the second device through SLE broadcast in response to determining that that no SLE connection is established between the electronic device and the second device.

10. The electronic device of claim 7, wherein the first information comprises at least one of the following:
- a broadcast frequency and a bandwidth of the electronic device;
- a root index of a synchronization signal of the electronic device;
- a physical layer identifier of the electronic device;
- an authentication credential of the electronic device;
- all or some content of broadcast information of the electronic device; or
- all or some content of communication domain system information of the electronic device.

11. The electronic device of claim 10, wherein the second information comprises:
- the synchronization signal;
- a first part of the broadcast information; and
- a second part of the communication domain system information.

12. The electronic device of claim 11, wherein the first information does not comprise the first part or the second part.

13. The electronic device of claim 10, wherein, when the first information is sent through SLE broadcast, the first information does not comprise the physical layer identifier or the authentication credential.

14. A computer program product comprising computer-executable instructions stored on a non-transitory computer-readable storage medium, wherein the computer-executable instructions when executed by a processor of a first device, cause the first device to:

send first information to a second device by using a sparklink-low energy (SLE) access technology;

send second information to the second device by using a sparklink-basic (SLB) access technology;

receive a request from the second device to establish an SLB connection to the second device, wherein the request is based on the first information and the second information; and establish the SLB connection to the second device according to the request.

15. The computer program product of claim 14, wherein the computer-executable instructions when executed by the processor, further cause the first device to:

establish an SLE connection between the first device and the second device; and send the first information to the second device through the SLE connection.

16. The computer program product of claim 14, wherein the computer-executable instructions when executed by the processor, further cause the first device to:

determine that no SLE connection is established between a first device and the second device; and send the first information to the second device through SLE broadcast in response to determining that that no SLE connection is established between the first device and the second device.

17. The computer program product of claim 14, wherein the first information comprises at least one of the following:

a broadcast frequency and a bandwidth of a first device;

a root index of a synchronization signal of a first device;

a physical layer identifier of a first device;

an authentication credential of a first device;

all or some content of broadcast information of a first device; or all or some content of communication domain system information of a first device.

18. The computer program product of claim 17, wherein the second information comprises:

the synchronization signal;

a first part of the broadcast information; and a second part of the communication domain system information.

19. The computer program product of claim 17, wherein, when the first information is sent through SLE broadcast, the first information does not comprise the physical layer identifier or the authentication credential.

20. The computer program product of claim 18, wherein the first information does not comprise the first part or the second part.

* * * * *